US010990236B2

(12) United States Patent
David et al.

(10) Patent No.: US 10,990,236 B2
(45) Date of Patent: Apr. 27, 2021

(54) METHODS FOR TWO-TOUCH DETECTION WITH RESISTIVE TOUCH SENSOR AND RELATED APPARATUSES AND SYSTEMS

(71) Applicant: 1004335 ONTARIO INC., Ottawa (CA)

(72) Inventors: Albert M. David, Manotick (CA); Robert Donald McCulloch, Ottawa (CA); Guy Michael Amyon Farquharson Duxbury, Ottawa (CA); Gueorgui Pavlov, Ottawa (CA)

(73) Assignee: 1004335 ONTARIO INC., Ottawa (CA)

( * ) Notice: Subject to any disclaimer, the term of this patent is extended or adjusted under 35 U.S.C. 154(b) by 0 days.

(21) Appl. No.: 16/785,201

(22) Filed: Feb. 7, 2020

(65) Prior Publication Data
US 2020/0257390 A1 Aug. 13, 2020

Related U.S. Application Data

(60) Provisional application No. 62/802,539, filed on Feb. 7, 2019.

(51) Int. Cl.
*G06F 3/045* (2006.01)

(52) U.S. Cl.
CPC .... *G06F 3/045* (2013.01); *G06F 2203/04104* (2013.01)

(58) Field of Classification Search
CPC ................. G06F 3/045; G06F 2203/04104
See application file for complete search history.

(56) References Cited

U.S. PATENT DOCUMENTS

| 3,750,149 A | 7/1973 | Sessler et al. |
| 4,897,511 A | 1/1990 | Itaya et al. |
| 5,008,497 A | 4/1991 | Asher |
| 5,943,043 A | 8/1999 | Furuhata et al. |
| 6,255,604 B1 | 7/2001 | Tokioka et al. |

(Continued)

FOREIGN PATENT DOCUMENTS

| CN | 102033674 A | 4/2011 |
| CN | 102750063 A | 10/2012 |

(Continued)

OTHER PUBLICATIONS

Aufranc, "CNX Software—Embedded Systems News," Toshiba Resistive Multi-touch Screen, (Mar. 8, 2011), pp. 1-4.

(Continued)

*Primary Examiner* — Stacy Khoo
(74) *Attorney, Agent, or Firm* — TraskBritt

(57) ABSTRACT

The disclosure provides methods and apparatuses for detecting two-touch events with a five-wire resistive touch sensor comprising an active layer and a sensing layer. The methods include, while a first voltage gradient is generated across an active layer of the sensor, measuring a first voltage of a sensing layer electrode and a current across the sensor. The methods further include, while the second voltage gradient is generated across the active layer, measuring a second voltage of the sensing layer electrode and a second current across the sensor. The first and second currents are compared to a respective threshold. A two-touch event is detected based on the comparison.

19 Claims, 20 Drawing Sheets

(56) References Cited

U.S. PATENT DOCUMENTS

| | | |
|---|---|---|
| 6,958,749 B1 | 10/2005 | Matsushita |
| 7,254,775 B2 | 8/2007 | Geaghan et al. |
| 7,633,300 B2 | 12/2009 | Keroe et al. |
| 8,106,892 B2 | 1/2012 | Felder et al. |
| 8,269,745 B2 | 9/2012 | Fang et al. |
| 8,294,688 B2 | 10/2012 | Sarasmo |
| 8,330,727 B2 | 12/2012 | Westerman et al. |
| 8,416,215 B2 | 4/2013 | Sherman |
| 8,633,914 B2 | 1/2014 | Hollemans et al. |
| 8,730,205 B2 | 5/2014 | Tsumura et al. |
| 8,810,545 B2 | 8/2014 | Fahn et al. |
| 8,947,393 B2 | 2/2015 | Hwang |
| 9,141,249 B2 | 9/2015 | He et al. |
| 9,152,287 B2 | 10/2015 | Calpe et al. |
| 9,389,744 B2 | 7/2016 | Lv et al. |
| 9,465,500 B2 | 10/2016 | Hernandez et al. |
| 9,727,194 B2 | 8/2017 | Fujita et al. |
| 9,851,827 B2 | 12/2017 | Miller et al. |
| 2003/0071797 A1 | 4/2003 | Chang et al. |
| 2004/0001048 A1 | 1/2004 | Kraus et al. |
| 2005/0017959 A1 | 1/2005 | Kraus et al. |
| 2005/0046621 A1 | 3/2005 | Kaikuranta |
| 2006/0097991 A1 | 5/2006 | Hotelling et al. |
| 2007/0089914 A1 | 4/2007 | Yang et al. |
| 2009/0073131 A1 | 3/2009 | Yeh |
| 2009/0096758 A1 | 4/2009 | Hotelling et al. |
| 2009/0128514 A1 | 5/2009 | Liu et al. |
| 2009/0146963 A1 | 6/2009 | Yeh et al. |
| 2009/0159343 A1 | 6/2009 | Chung |
| 2009/0189877 A1 | 7/2009 | Washino et al. |
| 2009/0309847 A1 | 12/2009 | Russell et al. |
| 2009/0322699 A1 | 12/2009 | Hansson |
| 2009/0322700 A1 | 12/2009 | D'Souza et al. |
| 2009/0322701 A1 | 12/2009 | D'Souza et al. |
| 2010/0001977 A1 | 1/2010 | Lin et al. |
| 2010/0053093 A1 | 3/2010 | Kong et al. |
| 2010/0149122 A1 | 6/2010 | Lin |
| 2010/0164905 A1 | 7/2010 | Woo et al. |
| 2010/0283761 A1 | 11/2010 | Chang |
| 2011/0043462 A1 | 2/2011 | Shabra et al. |
| 2011/0043480 A1 | 2/2011 | Popovich et al. |
| 2011/0134072 A1 | 6/2011 | Li et al. |
| 2011/0157083 A1 | 6/2011 | Hershman et al. |
| 2011/0254803 A1 | 10/2011 | Chae et al. |
| 2012/0001854 A1 | 1/2012 | Tikkanen |
| 2012/0068969 A1 | 3/2012 | Bogana et al. |
| 2012/0154325 A1 | 6/2012 | Ueno |
| 2012/0249440 A1 | 10/2012 | Yi et al. |
| 2012/0249471 A1 | 10/2012 | Yi et al. |
| 2013/0027343 A1 | 1/2013 | Calpe et al. |
| 2016/0239200 A1 | 8/2016 | Fang |
| 2019/0294297 A1* | 9/2019 | Sasai ................ G06F 3/044 |

FOREIGN PATENT DOCUMENTS

| | | | |
|---|---|---|---|
| CN | 102999243 A | 3/2013 | |
| CN | 103218103 A | 7/2013 | |
| WO | 2012/073173 A1 | 6/2012 | |
| WO | 2012/073261 A1 | 6/2012 | |
| WO | 2013/027132 A1 | 2/2013 | |
| WO | WO-2018116706 A1 * | 6/2018 | ........... G06F 3/0443 |

OTHER PUBLICATIONS

BU210xx series of 4-wire resistive touch panel controller Ics, Comparison of screen control functionality, ROHM News, 2013, 3 pages.

Calif, "ROHM Introduces Industry's First Multi-Touch Controller for Resistive Touchscreens," San Diego, (Jun. 7, 2011), pp. 1-3.

Calpe et al., "AD7879 Controller Enables Gesture Recognition on Resistive Touch Screens," Analog Dialogue 45-06, (Jun. 2011), pp. 1-5.

Camarillo, "Semtech Expands the 4D-Touch (Trademark) Platform With Multi-Touch Support to Enhance," Business Wire, (Oct. 25, 2011), pp. 1-2.

CRTouch Data Sheet, "Capacitive and Resistive Touch Sensing Application Specific IC.," Freescale Semiconductor, Inc., 2007-2012, Document No. CRTOUCHDS, Rev. 3, (Apr. 2013), pp. 1-68.

Johnson, "Multi-Touch Added to Resistive Touchscreens," E Times, (2012), (available at https://www.eetimes.com/multi-touch-added-to-resistive-touchscreens/#), 3 pages.

Loviscach, "Two-Finger Input With a Standard Touch Screen," UIST'07, (2007), pp. 169-172.

* cited by examiner

METHODS FOR TWO-TOUCH DETECTION WITH RESISTIVE TOUCH SENSOR AND RELATED APPARATUSES AND SYSTEMS

CROSS-REFERENCE TO RELATED APPLICATION

This application claims the benefit of the filing date of U.S. Provisional Patent Application Ser. No. 62/802,539, filed Feb. 7, 2019, for "RESISTIVE TWO-TOUCH SENSOR METHODS AND APPARATUSES," the disclosure of which is hereby incorporated herein in its entirety by this reference.

TECHNICAL FIELD

The present disclosure relates to touch sensor devices, and more particularly to resistive touch sensor devices.

BACKGROUND

Touch sensor devices sense touch contact position on the sensor in one or two dimensions. The touch contact is caused by a finger or other object (e.g., stylus) touching the surface of the touch sensor. Typical touch sensors sense touch in two dimensions (e.g., X-axis and Y-axis coordinates of a contact position). One common touch sensor device is a touch sensor which combines touch sensor capabilities with display capabilities. Touch sensors may be single-touch or multi-touch devices. For example, a two-touch capable touch sensor can resolve and distinguish two concurrent touch contact positions. Single-touch device, on the other hand, means that the touch sensor is only capable of detecting a single touch event at a given time. A "gesture" is a function activated by moving the touch contact position or positions along the surface of the sensor in a pattern that corresponds to a function, where the pattern is detected by the device. The device then performs the corresponding function. For multi-touch sensors the most commonly used multi-touch gestures are "pinch," "zoom" and "rotate," which are two-touch gestures.

One type of touch sensor technology is the "resistive" touch sensor. Resistive touch sensors typically comprise first and second slightly separated layers of transparent material. The first layer may be referred to as the "front" layer herein and the second layer may be referred to as the "rear" layer herein. The front layer overlies the rear layer. The front layer has enough flexibility that it can bend slightly when touched. The two layers of the touch sensor typically each have a face coated with a conductive material, and the conductive faces of the layers face each other (with a slight separation).

Touch sensors are often used in "touchscreen" devices, in which the touch sensor is integrated with a display screen. For touch screen devices, the conductive coating is typically transparent. A common conductive coating used in touch screens is Indium Tin Oxide (ITO). A gas, typically air, fills the slight separation between the layers. Additionally, a layer of spaced apart microdots may be disposed between the two layers to maintain the separation when not being touched, but also allowing the front layer to be pushed to contact the rear layer during a touch.

Resistive touch sensors are traditionally single-touch devices. The most popular styles of resistive touch sensors are known as "four-wire" and "five-wire" resistive touch sensors. "8-wire" touch sensors are also available. The terms "four-wire," "five-wire," and "8-wire" refer to the 4, 5 or 8 wire electrical connections between the touch sensor and the controller or control electronics.

Typically, for resistive touch screens electrodes are positioned at or near the edges of the ITO layers. The electrodes are used to apply different voltages to either edge of one ITO layer and set up a voltage gradient. While the gradient is set up on the one (active) ITO layer, the electrode(s) on the other ITO layer samples the voltage to detect touch position. Voltage gradients are alternatingly set up in two orthogonal directions (e.g., X and Y axis directions). A touch event causes the ITO layers to contact each other at the touch position(s), and the measured voltage changes due to the contact. Samples are taken alternatingly in synchronization with voltage gradients being set up in the two orthogonal directions, allowing the "sensing" ITO layer to sense the voltage during both gradient directions and therefore determine the touch position.

By sensing the voltages using electronics with a relatively high impedance input, the effect of any resistance of ITO of the sensing layer can be arranged to introduce negligible inaccuracy into determination of the touch position. Having only a connection to high input impedance electronics, the sensing layer essentially behaves passively.

ITO can be categorized both as a ceramic and as an alloy. It typically has less long-term durability against deformation compared to the nonconductive transparent substrate(s) of the layers coated by the ITO. After perhaps hundreds of thousands of touches and/or abusive touches and/or firm contact with rigid objects, microscopic cracks form in the ITO of the front touch sensor layer because this is the layer that gets slightly deformed during contact.

In a "four-wire" resistive touch sensor, a first of the two layers is used to set up a voltage gradient in a first direction (e.g., horizontal) and the second of the two layers performs the voltage/position sensing. The second layer is used to set up the voltage gradient in a second direction (e.g., vertical) while the first layer performs the voltage/position sensing. Thus, each of the conducting layers continuously alternates between functioning as the "active" and "sensing" layer. The electrodes for one conductive layer may extend along the top and bottom edges for setting up the vertical voltage gradient, and electrodes for the other conductive layer may extend along the left and right edges for setting up the horizontal gradient. These electrode pairs alternate between: (1) being used to set up voltage gradients; and (2) being used to sense voltage at the touch contact position.

Over time, the repeated deformations of the front layer during touch events may create micro-cracks or other imperfections in the conductive coating. The micro-cracks or other imperfections typically do not cause significant effects for the high impedance sensing layer functionality. On the other hand, such micro-cracks or other imperfections can negatively affect the voltage gradient when the front layer functions as the "active" layer. Thus, in a "four-wire" touch sensor, the ability of the device to accurately detect touch position along one axis (X or Y) may degrade over time.

In a typical "five-wire" style resistive touch sensor, a first conductive layer is consistently used to perform the high impedance voltage/position sensing while a second layer is consistently used to set up the voltage gradients, where the voltage gradients alternate between the two directions (i.e., X and Y gradients). Thus, the first layer is consistently the "sensing" layer, while the second layer is consistently the "active" layer. Typically, the first (sensing) layer is the front layer, while the second (active) layer is the rear layer. In typical five-wire style resistive touch sensors, a sensing layer electrode connects to the sensing layer to perform the voltage sensing, and four active layer electrodes are positioned at each of the four corners of the rear conductive layer. The four drive (corner) electrodes set up alternating horizontal and vertical voltage gradients in the rear conductive layer.

The touch sensor typically includes linearizing features connecting between the active layer electrodes. The linearizing features may provide graduated fractions of the driven electrode voltage biasing at multiple points around the periphery of the active layer.

If built from the same materials, a five-wire resistive touch sensor and four-wire touch resistive touch sensor may initially have practically indistinguishable performance and characteristics. However, once micro-cracks have formed, the voltage gradient in the front layer may become distorted for a four-wire touch sensor. Therefore, sensed voltages may no longer represent touch position as accurately as when the four-wire touch sensor was new. In five-wire resistive touch sensors, micro-cracks caused in the front (sensing) layer do not cause distortion in the voltage gradients of the rear (active) layer. Furthermore, since the voltage sensing uses electronics with high input impedance, minor changes in resistance of the front (sensing) conductive layer may have only negligible effects. Thus, a five-wire touch sensor may be more durable than a four-wire touch sensor with similar materials and construction.

As noted above, resistive touch sensors are typically single-touch devices. However, the multi-touch devices (such as multi-touch capacitive touch sensors) allow for a wider range of touch functionality due to the ability to sense multiple concurrent touches and multi-touch gestures. It would be desirable to combine multi-touch functionality with the durability of five-wire resistive touch sensors. However, the traditional voltage gradient measurements five-wire touch sensors described above cannot resolve the positions of two touch events. Instead, these measurements correspond to the average of the x and y ordinates of the two touch contact positions.

BRIEF SUMMARY

According to an aspect, there is provided a method for a five-wire resistive touch sensor comprising a first conductive layer, a first layer electrode, a second conductive layer, and a four second layer electrodes, the method comprising: generating a first voltage gradient in a first direction across the second conductive layer; while the first voltage gradient is active, measuring a first voltage of the second layer electrode and a first current across the touch sensor; generating a second voltage gradient in a second direction across the second conductive layer; while the second voltage gradient is active, measuring a second voltage of the second layer electrode and a second current across the sensor; comparing each of the first and second currents to a respective threshold; and detecting a two-touch event as a function of said comparing.

In some embodiments, wherein the four second layer electrodes are positioned at or proximate four corners of the second conductive layer respectively.

In some embodiments, the first direction is substantially orthogonal to the second direction.

In some embodiments, said detecting a two-touch event comprises detecting that at least one of the first and second currents exceeds the respective threshold.

In some embodiments, the method further comprises determining first and second touch contact positions of the two-touch event.

In some embodiments, determining the first and second touch contact positions comprises: estimating a first spacing of the contact positions in a first dimension corresponding to the first direction as a function of the first current; estimating a second spacing of the contact positions in a second dimension corresponding to the second direction as a function of the second current; and estimating two ordinates for the first dimension as a function of the first spacing and the first measured voltage, and estimating two ordinates for the second dimension as a function of the second spacing and the second measured voltage.

In some embodiments, the method further comprises refining the estimated ordinates.

In some embodiments, the method further comprises measuring a contact resistance between the first conductive layer and the second conductive layer.

In some embodiments, refining the estimated ordinates further comprises compensating the estimated ordinates for the first dimension and the estimated ordinates for the second dimension as a function of the measured contact resistance.

In some embodiments, measuring the contact resistance comprises measuring a resistance between the first layer electrode and, collectively, the four second layer electrodes.

In some embodiments, the method further comprises measuring, for each said second layer electrode, a respective individual resistance between the second layer electrode and the first layer electrode.

In some embodiments, refining the estimated ordinates further comprises, compensating the measured contact resistance as a function of the measured individual resistances between the four second layer electrodes and the first layer electrode prior to the estimated ordinates as a function of the measured contact resistance.

In some embodiments, the method further comprises pairing the estimated ordinates for the first dimension and the estimated ordinates for the second dimension to provide first and second contact position coordinates.

In some embodiments, the method further comprises: generating first corner-to-corner voltage gradient in the second conductive layer and measuring a first corner-to-corner current; and generating second corner-to-corner voltage gradient in the second conductive layer and measuring a second corner-to-corner current, wherein the pairing of the estimated ordinates is based in part on a comparison of the first and second corner-to-corner currents.

According to another aspect, there is provided a controller apparatus for a five-wire touch sensor comprising a first conductive layer, a first layer electrode, a second conductive layer, four second layer electrodes, the controller apparatus comprising: a processor; voltage drive circuitry for driving each of the four second layer electrodes and the first layer electrode; detector circuitry for detecting a voltage output of each of at least three of the four second layer electrodes and the first layer electrode; and memory operably coupled to the processor and having processor-executable instructions stored thereon that, when executed, cause the processor to implement one or more of the methods described herein.

In some embodiments, the detector circuitry comprises, for each of at least one of the electrodes, a respective Analog to Digital Converter (ADC).

In some embodiments, the detector circuitry further comprises, for each of at least one of the electrodes, a respective offset circuit that amplifies a difference between a baseline voltage and the voltage output of the corresponding electrode.

In some embodiments, each said offset circuit comprises a respective Digital to Analog Converter that outputs a baseline voltage, and a respective amplifier that amplifies the difference between the baseline voltage and the voltage output of the corresponding electrode, the difference being input to the corresponding ADC.

According to another aspect, there is provided a touch sensor system comprising: a five-wire resistive touch sensor; and the controller as described herein.

According to another aspect, there is provided a method for touch sensor, the method comprising: receiving a voltage output from an electrode of the touch sensor; amplifying a difference between a baseline voltage and the voltage output of the corresponding electrode; and generating a detector output as a function of the amplified difference.

In some embodiments, the touch sensor may further comprise a linearity pattern of a conductive material that extends around the periphery of the first or second layer.

Other aspects and features of the present disclosure will become apparent, to those ordinarily skilled in the art, upon review of the following description of the specific embodiments of the disclosure.

BRIEF DESCRIPTION OF THE DRAWINGS

The present disclosure will be better understood having regard to the drawings in which.

DETAILED DESCRIPTION

Figure 1A:
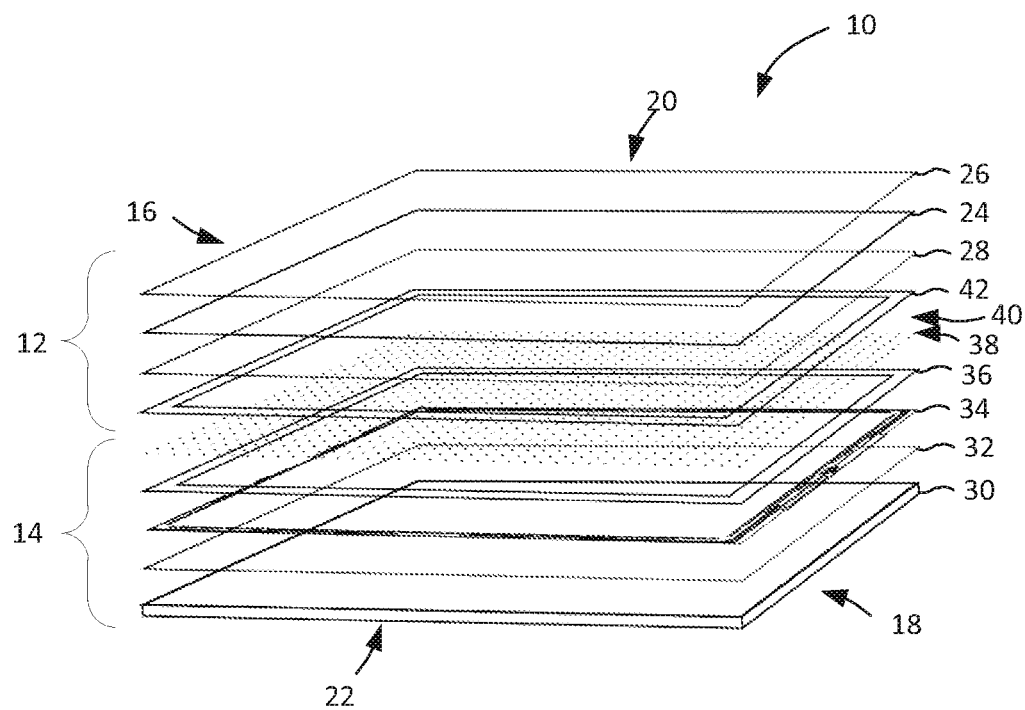
FIG. 1A is an exploded perspective view of an example five-wire resistive touch sensor.

It is to be understood that the disclosure is not limited to the specific example embodiments described herein. It is also to be understood that the terminology used herein is for the purpose of describing particular embodiments, and is not intended to be limiting.

Unless defined otherwise, all technical and scientific terms used herein have the same meaning as commonly understood by one of ordinary skill in the relevant art.

As used herein, the singular forms "a," "an," and "the" include plural referents unless the context clearly dictates otherwise. It is to be understood that references herein to orientations such as "front," "rear," "side," "upper," "lower," "vertical," "horizontal" and the like, or to directions such as "forward," "backward," "up," "down" and the like are for ease of description and are not intended to limit the orientation of the embodiments described herein and shown in the figures. Unless otherwise stated, the elements shown in the drawings are not necessarily shown to scale, and specific or precise dimensions or size ratios should not be inferred from the scale of features shown in the drawings unless otherwise stated.

In comparison to some other types of touch sensors, resistive touch sensors may be lower cost to manufacture, operable in a wide variety of harsh environments and/or generate less electromagnetic and radio frequency interference. However, as noted above, resistive touch sensor devices operate as single-touch sensors. It would be desirable to add multi-touch functionality, but the traditional voltage gradient measurements performed by conventional resistive touch sensors are not sufficient for this purpose.

FIG. 1A is an exploded perspective view of an example resistive touch sensor 10, although embodiments are not limited to the specific configuration of this touch sensor 10 described below. The touch sensor 10 may be a five-wire resistive touch sensor. The touch sensor 10 is generally flat and rectangular in shape, although embodiments are not limited to a particular shape. The touch sensor 10 has opposite side edges 16 and 18, top edge 20 and bottom edge 22, which may simply be referred to herein as "sides," "top" and "bottom," respectively.

The touch sensor 10 includes a first conductive layer 12 and a second conductive layer 14 that is spaced apart from the first conductive layer 12. It will be appreciated that the term "conductive layer" does not require the entirety of the first and second conductive layers 12 and 14 to comprise an electrically conductive material. Rather, in this example, the first and second layers 12 and 14 each include a respective conductive coating 28 and 32. The conductive coatings 28 and 32 comprise ITO in this example. The first conductive layer 12 may be referred to herein as an "active" layer, and the second conductive layer 14 may be referred to as a "sensing" layer. The sensing layer 3 and active layer 14 have similar sizes (length and width) in this example. The sensing layer 12 overlays the active layer 14, with a small separation between the first and second layers 12 and 14.

The sensing layer 12 in this example includes a Polyethylene Terephthalate (PET) anti-newton ring film or sheet 24 that has an acrylic hard coat 26 facing away from the touch sensor 10 and the conductive coating 28 facing toward the active layer 14. The active layer 14 includes a glass substrate sheet 30 with the conductive coating 32 that faces the sensing layer 12.

The active layer 14 also includes a linearity pattern 34 (typically silver ink) extending around the conductive coating 32 near the sides 16 and 18, top 20 and bottom 22. The linearity pattern 34 is in turn covered by a dielectric protective layer 36. The linearity pattern 34 in this example is a conductive array of traces that act like a chain of resistors that interconnect four active layer electrodes (not shown) that are positioned at or proximate the four corners of the active layer 14. An electrode being "positioned at a corner" means that the electrode is generally at or in the proximity of the corner. The electrode may extend a distance in the X and/or Y direction from the corner. The linearity pattern 34 may help ensure that when touching close to the edge of the sensor, the touch sensed by the sensor does not wander in towards the center of the sensor such as in a pincushion pattern. The resistor chain formed by the linearity pattern 34 may compensate for the anomaly. The linearity pattern 34 may not be used for a conventional four-wire sensor. Other conductive, low ohm materials such as metals, conductive inks or other coatings may also be used for a linearity pattern rather than silver.

"Spacer dots" 38 may be provided on the active layer 14 to maintain an air gap 40 between the active layer 14 and the sensing layer 12. A narrow gasket 42 seals the air gap 40 around its periphery (i.e., at the sides 16, 18, top 20 and bottom 22). The spacer dots, which may be referred to as "microdots," are small spaced apart formations of a material suitable to maintain separation when no touch pressure is applied, but allowing the two conductive layers to be pressed together under sufficient applied pressure.

Figure 2:
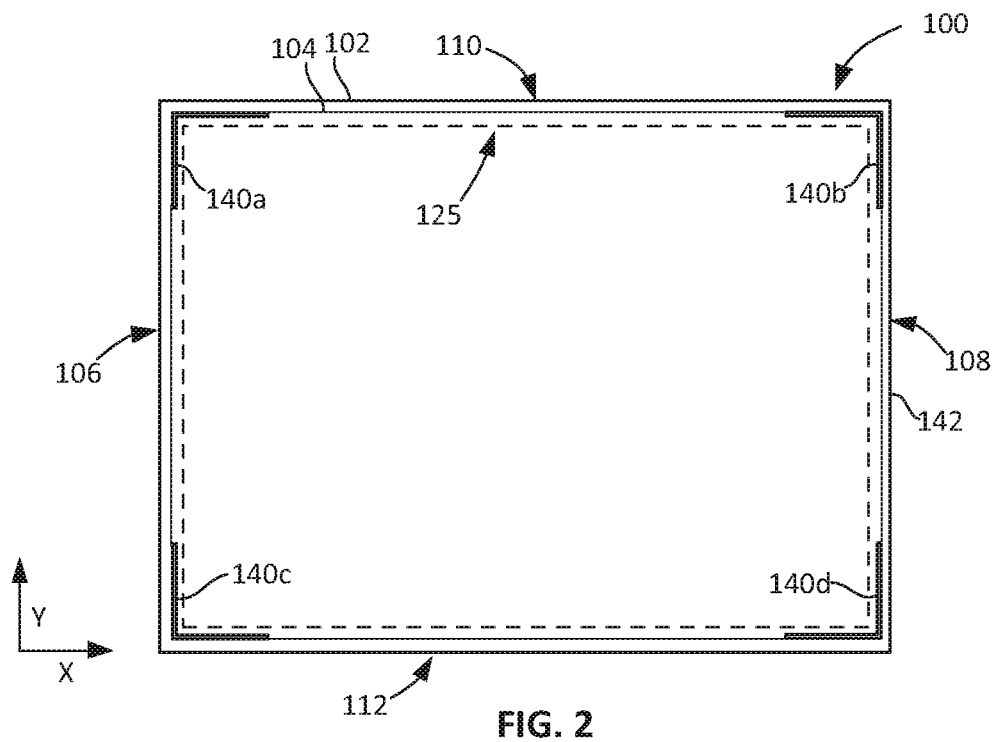
FIG. 2 is a top view of a resistive touch sensor according to some embodiments including four active layer electrodes and a sensing layer electrode.

The touch sensor 10 also includes the four active layer electrodes (not shown) and a sensing layer electrode (not shown) that may be similar to the electrodes 140a to 140d and 142 in FIG. 2.

The arrangement and specific materials and components of the touch sensor 10 in FIG. 1A are provided as an example only, and embodiments described herein are not limited to the particular layers, materials or configuration of the touch sensor 10 shown in FIG. 1A. In other embodiments, a resistive touch sensor may include additional components and/or omit one or more components of the touch sensor 10 of FIG. 1A. For example, in other embodiments, a metal mesh, organic coatings, carbon nano-tubes, silver nanowire, rather than ITO may be used for a conductive/resistive component of either the sensing or active layer. As another example, the linearity pattern 34 and/or other components may be omitted. In another example, the outer layer may be made of a thin hardened glass so as to be more resistant against physical damage. See, for example, FIG. 15, which is a side view of another example resistive touch sensor 1500 including a borosilicate glass outer layer.

Figure 1B:
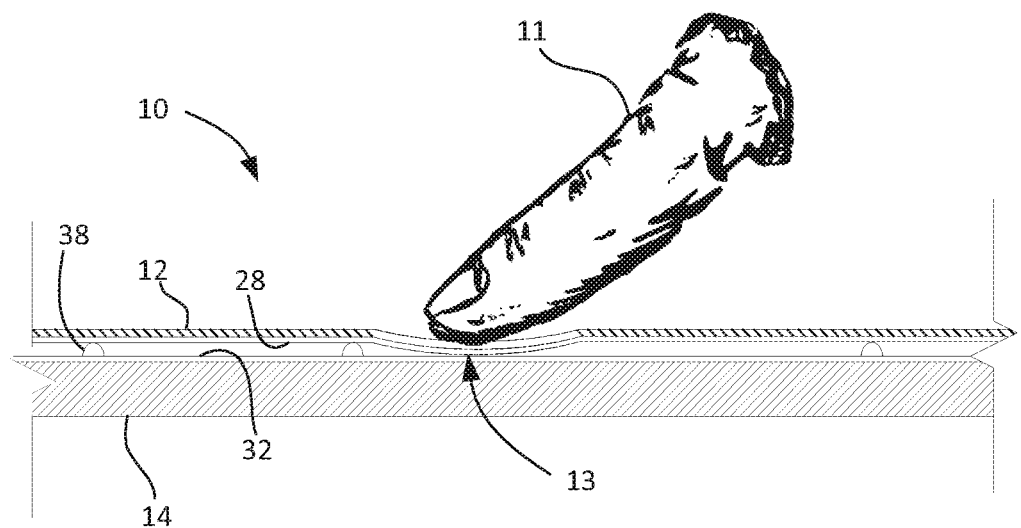
FIG. 1B is an enlarged partial side view of the touch sensor of FIG. 1A and a finger touching the touch sensor.

FIG. 1B is an enlarged partial side view of the touch sensor 10 and showing a finger 11 touching the touch sensor 10. As shown, the conductive coatings 28 and 32 of the layers 12 and 14 are normally separated, with the separation maintained by spacer dots 38. However, when touched by the finger 11 with sufficient pressure, the sensing layer 12 is deformed such that the conductive ITO coatings 28 and 32 contact at a contact position 13. When referencing a finger touch herein, it is to be understood that a variety of other objects, such as a stylus, may be used to contact the touch sensor 10, and embodiments are not limited to any particular object or part of the body being used to contact the touch sensor 10.

FIG. 2 is a top view of an example resistive touch sensor 100 according to some embodiments. The touch sensor 100 includes a first conductive layer 102 and a second conductive layer 104. The first conductive layer 102 overlays and is spaced apart from the second conductive layer 104 (the individual layers 102 and 104 are better seen in the perspective view of FIGS. 5A and 5B). The touch sensor 100 may be similar to the touch sensor 10 in FIG. 1A. The first conductive layer 102 will be referred to herein as the "sensing" layer 102 and the second conductive layer 104 will be referred to herein as the "active" layer 104 for ease of description. The touch sensor 100 includes four active layer electrodes 140a to 140d and a sensing layer electrode 142. In this embodiment, the sensing layer electrode 142 is a thin conductive strip that extends, at least partially, around the periphery of the sensing layer 102. The sensing layer electrode 142 may have other shapes, positions or arrangements on the sensing layer 102 in other embodiments. The electrodes 140a to 140d and 142 may, for example, comprise conductive ink extending in the regions illustrated. Each electrode may further comprise a contact or wire (not shown) connected to the conductive ink.

The four active layer electrodes 140a to 140d are arranged at or proximate the four corners of the active layer 104 (FIGS. 1A and 1B). Thus, the active layer electrodes 140a to 140d may also be referred to as "corner electrodes" herein. The sensing layer electrode 142 is arranged on the sensing layer 102 (FIGS. 1A and 1B) to measure a voltage at one or more contact positions between the active and sensing layers. Dashed line 125 near the periphery of the active layer 104 illustrates a general location for a linearity pattern (such as the linearity pattern 34 in FIG. 1A). The linearity pattern style may vary, and the pattern may also be omitted.

It is to be understood that the electrodes 140a to 140d and 142 are only exemplary and are not intended to be limiting. Electrode shape, composition and placement may vary. The four active layer electrodes 140a to 140d may be driven by a controller to create voltage gradients, as described herein. The sensing layer electrode 142 may be operably connected to the controller for measuring voltages as described herein. The sensing layer may be connected to the controller in a variety of ways. For example, the sensing layer may be connected to the controller from a single contact on just one side, multiple connections either directly or via a linearity pattern similar to what may be used on an active layer, or by a full periphery contact.

FIG. 2 also shows orthogonal "X" and "Y" directions relative to the touch sensor 100. The "X" and "Y" directions may also be referred to as horizontal and vertical respectively herein. However, these terms are for ease of description and do not limit the touch sensor 100 to any particular orientation during normal operation.

Figure 3:
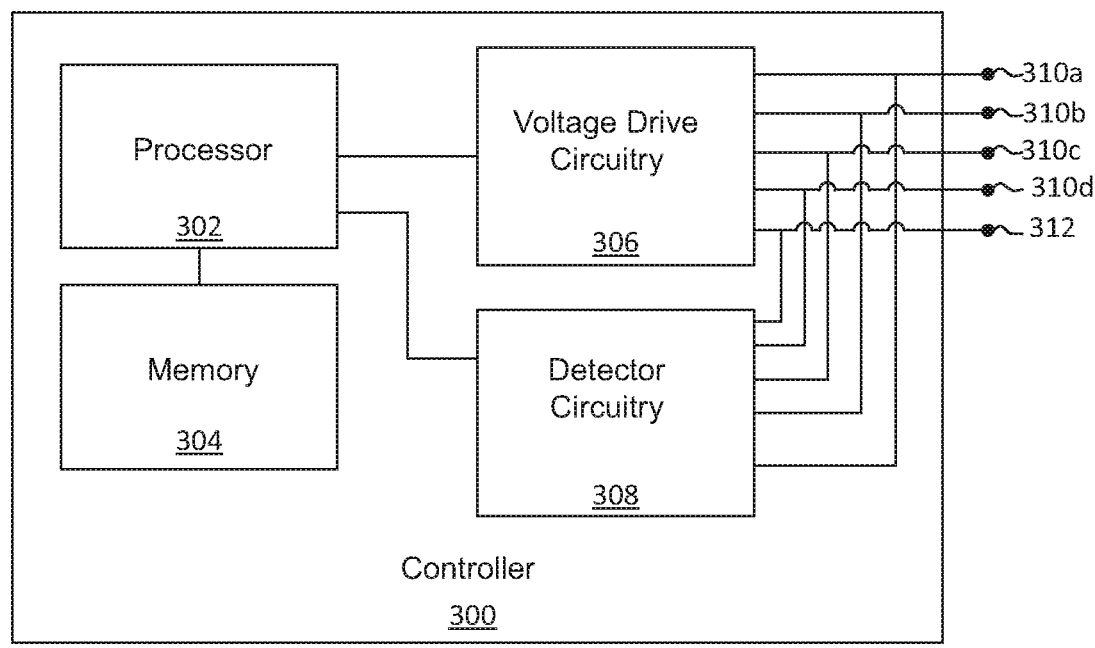
FIG. 3 is a block diagram of an example controller for a touch sensor according to some embodiments.

FIG. 3 is a block diagram of an example controller apparatus 300 according to some embodiments. The controller apparatus 300 may be used to control the touch sensor 100 in FIG. 2, although embodiments are not limited to the specific example touch sensor 100. The controller apparatus 300 includes a processor 302 and a memory 304 operably coupled to the processor 302. The memory 304 may store processor executable instructions that, when executed, cause the processor 302 to implement methods described herein for driving and/or controlling a touch sensor. The methods may include (but are not limited to) those described with reference to FIGS. 6 and 7 below. The memory may also store pre-programmed, and program derived data values. A portion or all of the memory 304 may be internal to the processor 302 in other embodiments. The term "memory" may refer to more than one block and/or type of memory, such as a combination of flash and dynamic memory as one example.

The controller further comprises voltage drive circuitry 306 and voltage detector circuitry 308. The voltage drive circuitry 306 is controlled by the processor 302 to generate output voltages to selectively drive electrodes of a touch sensor (such as the electrodes 140a to 140d and 142 of FIG. 2). The controller comprises four active layer electrode input/output ports 310a to 310d and a sensing layer electrode input/output port 312. The four active layer electrode input/output ports 310a to 310d may be connected to the active layer electrodes 140a to 140d of the touch sensor 100 in FIG. 2, for example. The controller apparatus 300 may, thus, selectively and individually drive the electrodes 140a to 140d of the touch sensor 100 to create the voltage gradients (e.g., horizontal and vertical) in the active layer 104 of the touch sensor 100. The sensing layer input/output port 312 may be operably connected to the sensing layer electrode 142 of the touch sensor 100 in FIG. 2.

As shown, each of the active layer electrode input/output ports 310a to 310d and the sensing layer electrode input/output port 312 is connected to both the voltage drive circuitry 306 and the voltage detector circuitry 308. In this way, each of the active layer electrodes 140a to 140d and the sensing layer electrode 142 may be individually driven and sensed for the various voltage, current and resistance measurements described below. However, in some embodiments, only the active layer electrode input/output ports 310a to 310d are connected to voltage drive circuitry 306 and/or only sensing layer electrode input/output port 312 is connected to the voltage detector circuitry 308. The term "active layer" is used herein for ease of description, even though the voltage or current of the active layer electrodes may be measured by the voltage detector circuitry 308. Similarly, the term "sensing layer" is used herein even though the sensing layer electrode may also be driven by the voltage drive circuitry 306.

Voltage drive circuitry 306 may optionally include a drive limiting and current sampling resistor on each output, which will be referred to herein as a "current sampling resistor" herein. The current sampling resistor may provide a measure of safety. The value(s) of the current sampling resistors may be chosen so that a full voltage range can be applied to any one or more of these drive limiting resistors, which may prevent driving current beyond what the drive circuitry can provide without introducing distortion (typically in the low 10's of mA) or causing damage to the drivers or touch sensor. If the resistor is too large it reduces the drive currents into the sensor compromising signal to noise levels excessively. The current sampling resistor values may be in the range of 10's of Ohms to a few 100's of ohms if driving voltages are in the range of a few or several volts (e.g., a typical range may be 1.5 V to 6 V). The current sampling resistors may be connected to a low drive to measure current ("low-side current sampling"). Alternatively, the current sampling resistors may be connected to a high drive to measure current ("high-side current sampling"), or any combination of low-side and high-side current sampling.

The voltage detector circuitry 308 may comprise an Analog to Digital Converter (ADC). The ADC may, for example, be a 5-up ADC and/or a 20-bit ADC, although embodiments are not limited to a particular type of ADC. Each of the input/output ports 310a to 310d and 312 may be connected to the ADC such that the ADC outputs digital values of the current voltages of the input/output ports 310a to 310d and 312. The input impedance of the ADC is typically high (e.g., in the range of 1 to 100 MOhm).

The voltage detector circuitry 308 may be arranged to detect a voltage of each of the active layer electrodes 140a to 140d and the sensing layer electrode 142. In other embodiments, the voltage detector circuitry 308 may only detect the voltage of three of the active layer electrodes 140a to 140d. The voltages detected at the three active layer electrodes 140a to 140d may be sufficient for the various measurements described below. For example, measuring X and Y current flows (measuring and summing current from two electrodes in each case) and measuring two different corner-to-corner current flows, as described below, may be accomplished with measuring the voltage output from only three of the active layer electrodes 140a to 140d.

The ADC may also be connected between a touch sensor electrode and a "current sampling" resistor which leads to a known voltage, such as ground or another fixed level (e.g., clean upper supply rail or even some other controlled voltage). This way, the voltage reaching the ADC may more accurately represent the current through the known sensing resistor.

Figure 17:
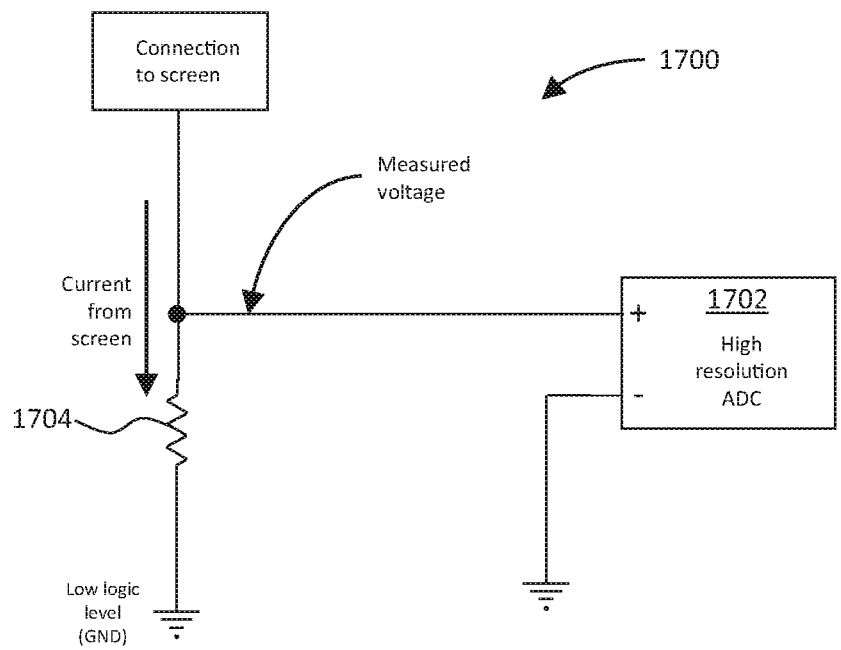
FIG. 17 is a functional block diagram of an example detector module according to some embodiments.

The voltage detector circuitry 308 may be capable of measuring small changes in voltages that have significant base levels. The small differences may be measured using an ADC having a sufficiently high resolution. In some cases, the signal changes caused by two-touch events may be quite small. Factors that could reduce the signal changes include: two touch contact positions are very closely spaced to one another; touch pressure is low (or soft); the touch sensor is quite large (e.g., more than 20"); and/or the front of the touch sensor has a protective layer (making the outer layer stiffer therefore further reducing touch pressure between the two opposing conductive transparent layers of the resistive touch sensor). In some cases, voltage measurement resolution up to 20 bits or more may be used to measure signal changes in cases such as these. FIG. 17 is a schematic diagram of example detector module 1700. The voltage detector circuitry 308 of the controller apparatus 300 in FIG. 3 may include a respective detector module 1700 for each of the five electrodes of a five-wire touch sensor.

The example detector module 1700 includes an ADC 1702. The ADC 1702 may be a fine resolution ADC. The term "fine resolution ADC" as used herein may refer to ADCs having a resolution of 16-bit and above (e.g., 20-bit resolution). The ADC 1702 receives the two-touch voltage and converts the voltage to a digital signal. A current sampling resistor 1704 is shown in parallel between the input of the ADC 1702 and ground. The current sampling resistor 1704 in this embodiment may be placed in line with the current flow out of a touch screen electrode. This way, the voltage across the current sampling resistor 1704 may be proportional (by a known proportionality constant—the resistance) to the current flow. The current sampling resistor value may be chosen to be: a) small enough that the voltages across it do not excessively limit the differential driving voltages that may be applied to the touch sensor's electrodes; and b) large enough that a measurable voltage is created that is comfortably above the noise level. This value of the current sampling resistor 1704 may be in the range of 1 to 1000 Ohm, for example.

Commercial touch sensors may typically "read" more than 100 times per second, and some currently available fine resolution ADCs with sufficient speed may be costly. Touch sensors performing 200 or 300 "screen reads" per second are becoming more common. Analog to digital converters (ADCs) with 20 bit resolution and speed may not be available at a price suitable for a commercial touch sensor. Available ADCs with a lower resolution may be faster and cheaper. Such ADCs may be in the range of 8 to 12 bit resolution. ADCs in this range may be referred to herein as "standard" resolution for ease of description and because ADCs in that range may be more widely available at a lower cost.

In some implementations, a standard resolution ADC may not be capable, by itself, of resolving the small voltage variations caused by a two-touch event. Thus, in some embodiments, the detector module includes an offset circuit that offsets and amplifies the voltage input to allow for a standard resolution ADC to be used. The one or more offset circuits may be configurable for different expected voltage levels.

Figure 18:
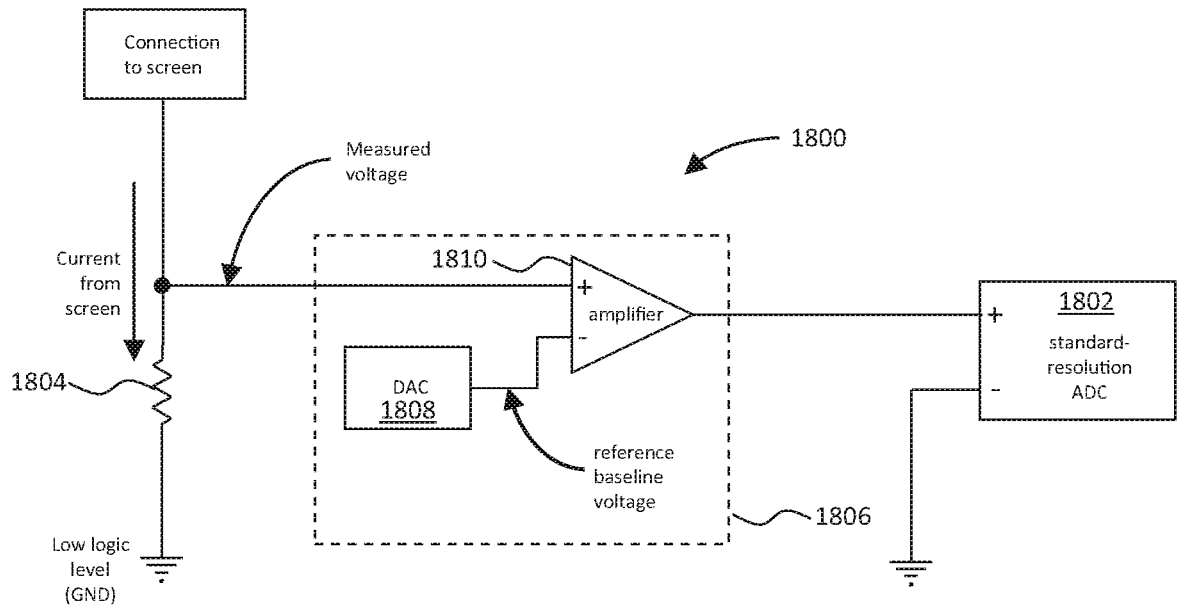
FIG. 18 is a functional block diagram of another example detector module according to some embodiments.

FIG. 18 is a schematic diagram of an example detector module 1800 that includes an offset circuit 1806. The detector module 1800 also includes a current sampling resistor 1804 and an ADC 1802. The ADC 1802 in this example may be a "standard" resolution ADC (e.g., in the range of 8 to 12 bit resolution). For example, the ADC 1802 may have 12 bit resolution.

The offset circuit in 1806 this embodiment comprises at least one Digital to Analog Converter (DAC) 1808. The DAC 1808 may have 8 bits or more of accuracy, though embodiments are not limited to any particular type of DAC. The detector module 1800 may include also one or more amplifiers 1810. The DAC may be configured to generate a base or "offset" voltage that is near the expected voltage output level from the corresponding electrode(s) of the touch sensor. The amplifier 1810 may be configured to amplify a difference between a baseline voltage set by the DAC 1808 and the voltage input from the electrode(s). This may lower the resolution required of the ADC 1802 to detect small changes in voltage compared to the embodiment in FIG. 17. If the DAC 1808 has an 8-bit accuracy and the ADC 1802 has 12-bit resolution, the detector module 1800 of FIG. 18 may be capable of resolving the voltage differences in the same range as the 20-bit ADC of the detector module 1700 of FIG. 17. A "standard" resolution (e.g., 12 bit) ADC may be faster and/or less expensive than a higher resolution (e.g., 20 bit) ADC. Thus, by using the DAC 1808 combined with a lower resolution ADC 1802 the measurements to calculate touch positions may be taken at a higher rate.

The voltage output of the DAC 1808 may be set based on voltage measurements. The DAC may not need to be set frequently. In some embodiments, initial measurements for setting the DAC offset voltage level(s) is initially done shortly after power-up when there is no dual contact with the sensor (so current flows are at baseline levels close to those seen during two-touch situations). During subsequent normal operation, the small remaining difference between each baseline level and the signal to be measured gets amplified and this amplified level measured by the ADC.

In some embodiments, the baseline level(s) may be dynamically adjusted. For example, the voltage output from the touch sensor electrode(s) may be regularly and/or gradually tracked, and the baseline voltage of the DAC(s) may be adapted based on the voltage output from the electrode(s). The baseline voltage may change as temperature or other environmental factors change. This tracking and/or adjusting may be done when the touch sensor is idle. In some embodiments, the baseline voltage level may be kept a minimum threshold below the value being measured to avoid inadvertently masking the initial changes in the voltage being measured. On the other hand, it may be desirable to prevent the baseline voltage level from falling so much that the maximum amplified measurement value might exceed the range of the ADC measurement (which could mask "high end" of values of interest).

Figure 4A:
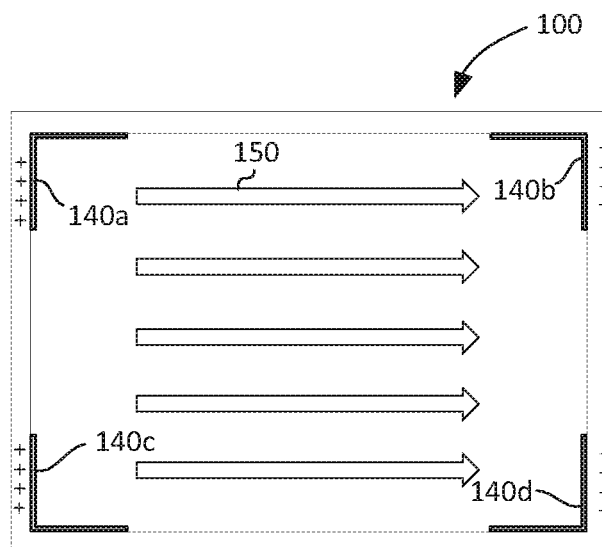
FIG. 4A is a top view of the touch sensor of FIG. 2 illustrating an example X-direction (horizontal) voltage gradient.
Figure 4B:
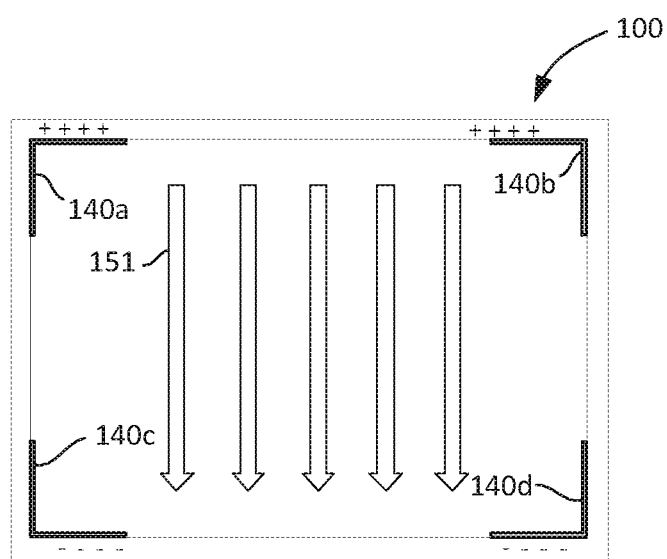
FIG. 4B is a top view of the touch sensor of FIG. 2 illustrating an example Y-direction (vertical) voltage gradient.

In typical single-touch operation, the voltage for each orthogonal voltage gradient (X and Y directions) is measured by the sensing layer electrode (e.g., electrode 142 in FIG. 2). The voltage caused by a single touch provides an indication of the position of the touch. FIG. 4A illustrates an example X-axis (horizontal) voltage gradient set up by the active layer electrodes 140a to 140d of the touch sensor 100. More specifically, electrodes 140a and 140c are driven high and electrodes 140b and 140d are driven low, creating a gradient that is high-to-low from left to right, as illustrated by arrows 150. FIG. 4B illustrates an example Y-axis (vertical) voltage gradient set up by the active layer electrodes 140a to 140d. More specifically, electrodes 140a and 140b are high and electrodes 140c and 140c are low, creating a gradient that is high-to-low from top to bottom, as illustrated by arrows 151.

However, for a two-touch event, the two touch positions do not yield two voltages for each gradient axis. Rather, the X-axis gradient measurement still yields a single voltage that will be approximately an average of the voltage corresponding to the two X positions (ordinates), and the Y-axis gradient measurement still yields a single voltage that will be an approximate average of the voltage corresponding to two Y positions (ordinates). Examples of single and two-touch events will now be described with reference to FIGS. 5A to 5D. In FIGS. 5A to 5D, FIGS. 8A and 8B, and FIGS. 10A to 11D, resistances formed over an area of ITO between locations are represented as discrete independent resistors for illustrative purposes.

Figure 5A:
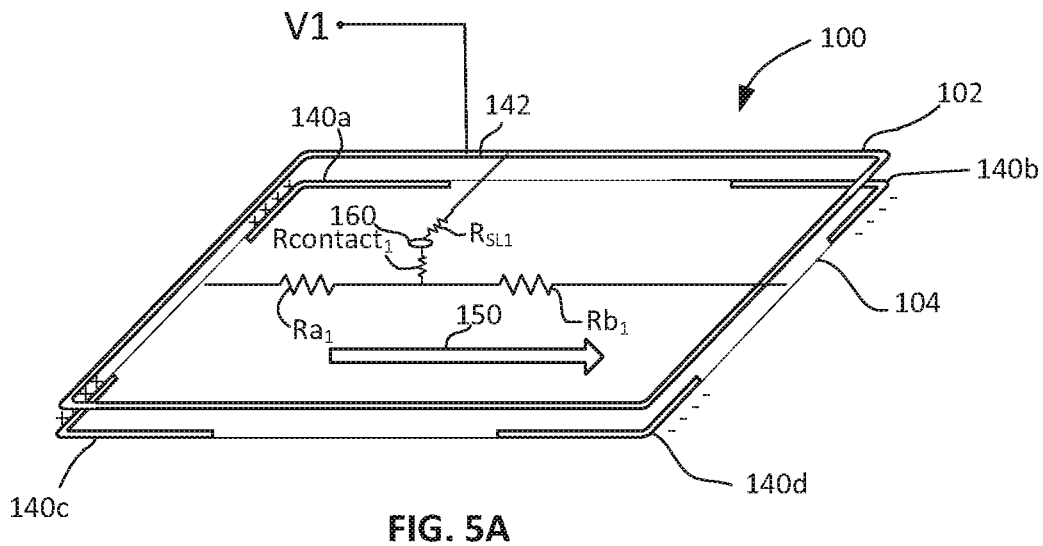
FIGS. 5A and 5B are perspective views of the touch sensor of FIG. 2 and showing example resistances and voltage measurements resulting from a single touch contact.
Figure 5B:
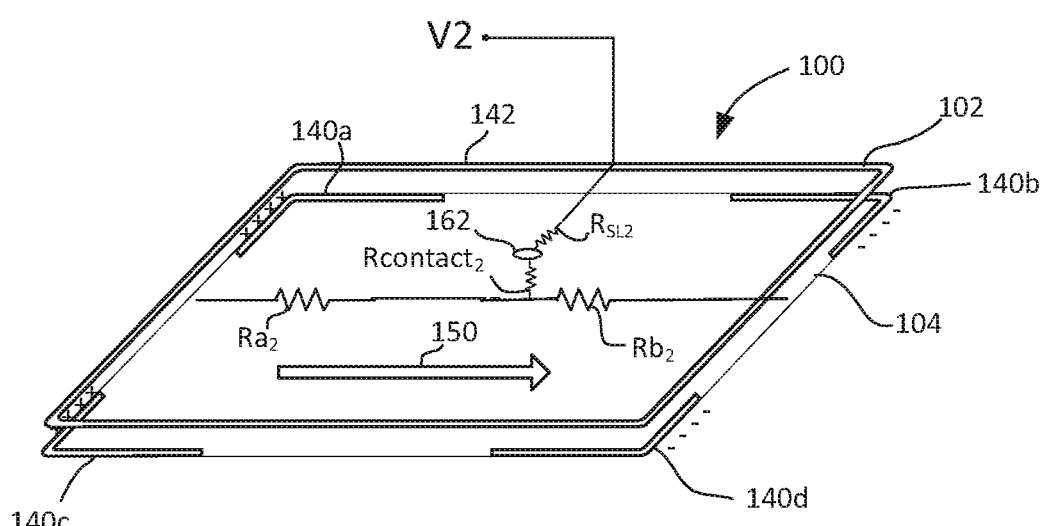
Figure 5C:
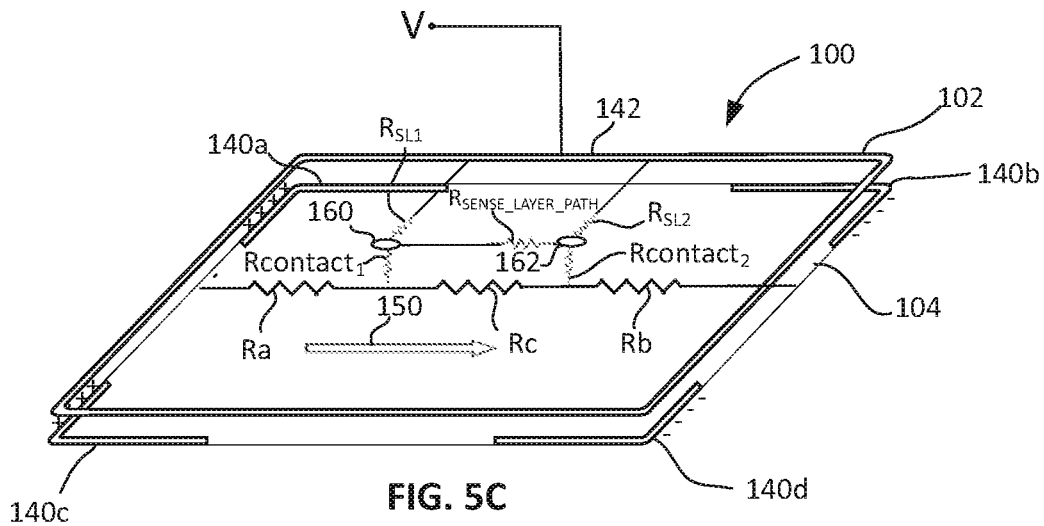
FIG. 5C is a perspective view of the touch sensor device of FIG. 2 and showing example resistances and voltage measurements resulting from two touch contacts at different locations on the screen.
Figure 5D:
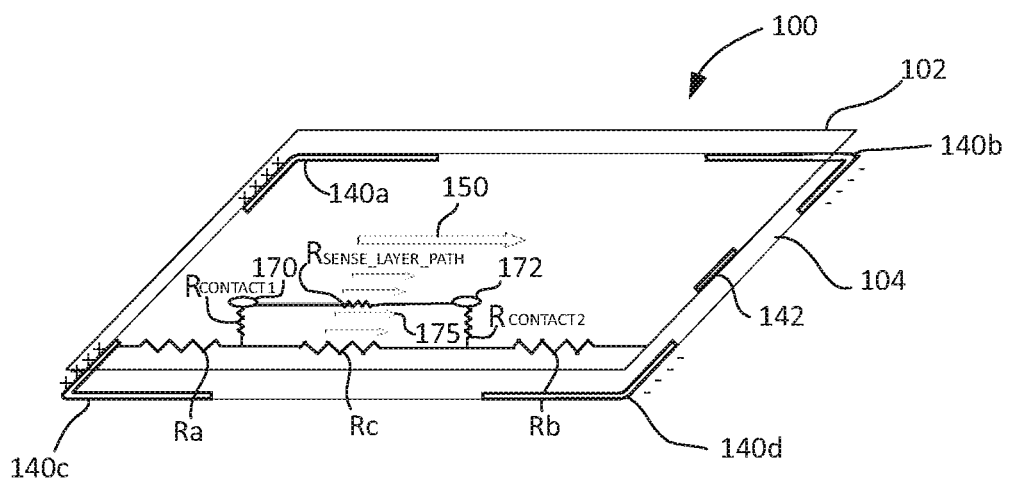
FIG. 5D is a perspective view of the touch sensor of FIG. 5C, but with an alternate sensing layer electrode configuration.

FIGS. 5A and 5B are perspective views of the touch sensor 100 when a single touch is applied. FIGS. 5C and 5D are perspective views of the touch sensor 100 when two touches are applied. The sensing and active layers 102 and 104 are shown separated to an exaggerated degree for illustrative purposes. In normal operation, the two layers will typically be very close to one another. Driving electrodes 140a to 140d and sensing layer electrode 142 are shown. In FIGS. 5A to 5D, the horizontal voltage gradient of FIG. 4A is applied (as indicated by arrow 150). In FIGS. 5A to 5D, arrow 150 indicates the gradient direction, but it is to be understood that the gradient may be fairly uniform in the Y direction (transverse to the gradient) for a given X-coordinate.

In FIG. 5A, the single touch contact position is indicated by the oval representing first contact position 160. The voltage V1 measured on the sensing layer electrode 142 is a function of the X-position of the first touch contact position 160 and is dependent on at least the following resistances: $Ra_1$; $Rb_1$; $Rcontact_1$; and $R_{SL1}$. The resistance Ra₁ is the resistance in the active layer between the first contact position 160 and the first active layer electrode 140a. The resistance Rb₁ is the resistance in the active layer between the first contact position 160 and the second active layer electrode 140b. The resistance Rcontact₁ is the contact resistance between the active layer 104 and the sensing layer 102. The resistance $R_{SL1}$ is the sensing layer resistance from the first contact position 160 to the sensing layer electrode 142.

In FIG. 5B, the single touch contact position is indicated by the oval representing second contact position 162, which is shifted in the X direction relative to the first contact position 160 in FIG. 5A. The voltage V2 measured on the sensing layer electrode 142 is a function of the X-position of the second touch contact position 162 and is dependent on at least the following resistances: Ra₂; Rb₂; Rcontact₂; and $R_{SL2}$. The resistance Ra₂ is the resistance in the active layer between the second contact position 162 and the first active layer electrode 140a. The resistance Rb₂ is the resistance in the active layer between the second contact position 162 and the second active layer electrode 140b. The resistance Rcontact₂ is the contact resistance between the active layer 104 and the sensing layer 102. The resistance $R_{SL2}$ is the sensing layer resistance (in the ITO) from the second contact position 162 to the sensing layer electrode 142.

In FIG. 5A, when the single touch contact area is small compared to the screen size and the impedance of the circuit measuring the voltage at the sensing layer electrode 142 may be very high compared to impedances of Ra₁, Ra₂, $R_{SL1}$ and RContact₁, then the voltage drop across $R_{SL1}$ and RContact₁ may be minimal and the voltage V1 will simply be determined by the driving voltages and the ratio of Ra₁ and Rb₁. The same may apply in FIG. 5B but with the voltage V2 being determined by the ratio of Ra₂ and Rb₂.

In both FIGS. 5A and 5B, the current flowing through the active layer from 140a plus 140c to 140b plus 140d may remain almost constant regardless of a single touch presence or its location, and the current may flow uniformly across the touch sensor and regardless of sensing layer electrode construction.

FIG. 5C shows the voltage measurement resulting from first and second concurrent touch contact positions 160 and 162 occurring concurrently during the cycle for the horizontal gradient, both touches being located well away from the edge of the touch sensor sensing area. In this case, Ra and Rb are equivalent to Ra₁ and Rb₂ above, and Rc represents the resistance in the active layer between the first and second contact positions 160 and 162. In this example (as in FIGS. 5A and 5B) the sensing layer electrode 142 extends all around the periphery of the ITO layer. The additional Rsense_layer_path is the resistance in the sensing layer 102 between the first and second contact positions 160 and 162. The voltage (V) measured at the sensing layer electrode 142 will be approximately the average of V1 and V2. Thus, additional information may be desired to distinguish between a single touch that corresponds to that average voltage and the dual touch shown in FIG. 5C.

The resistance of the active layer $R_{ACTIVE\_LAYER}$ seen by the first and second touch contact positions 160 and 162 may be estimated as Ra+Rb+Rc. The total resistance, $R_{TOTAL}$, between the first and second contact positions 160 and 162 while voltage is applied to set up a voltage gradient may be estimated as:

$$R_{TOTAL} \approx R_a + R_b + 1 \Big/ \left( \frac{1}{R_c} + \left( \frac{1}{(R_{SENSE\_LAYER\_PATH} + R_{CONTACT1} + R_{CONTACT2})} \right) \right)$$

As the width or spacing between touch contact positions in an axis increases, the extra current caused by the two touch contact positions may also increase. As two touch contacts approach the opposite polarity electrodes, the sum of Ra+Rb may be reduced. As a result, the resistance Rsense_layer_path in parallel with the resistance Rc may affect a larger percentage of the overall resistance. This may provide a mechanism to determine the space between the touch points in that axis.

The resistances $R_{SL1}$ and $R_{SL2}$ represent the additional effective impedances paths between the touch points from each touch to the sense electrode that may be factored in when there is a low impedance electrode all around the sense layer. With a low impedance electrode connection all around the sense layer, the effective value for $R_{SENSE\_LAYER\_PATH}$ may therefore reduce as both touch contact positions approach the periphery of the touch sensor, in turn further increasing current flow between 140a plus 140c to 140b plus 140d.

FIG. 5D is another perspective view of the touch sensor 100, illustrating two touches where the touches are located close to the edge of the touch sensor sensing area. In FIG. 5D, the sensing layer electrode 142 extends only a short distance on one side 501 of the touch sensor 100, rather than extending entirely around the periphery. Without a low impedance path around the periphery of the sense layer, the equivalent of $R_{SL1}$ and $R_{SL2}$ do not exist. As the touch locations approach the periphery of the touch sensor the lack of ITO on one side of the line between the two touches increases the resistance of $R_{SENSE\_LAYER\_PATH}$ relative to a pair of touches 170, 172 in the middle of the touch sensor, reducing the amount of additional current flowing through the active layer.

In FIG. 5D, the small arrows 175 represent the small extra current flow in the ITO of the sensing layer 102 because two touches are pressing this layer against the ITO of the active layer 104 which has a voltage gradient applied. This extra current path allows more current to flow across from the two electrodes 140a and 140c on the left into the two electrodes 140b and 140d on the right.

In some embodiments, a linearity pattern of electrode conductor may extend around the periphery of the sensing layer 102. The linearity pattern may be similar to the example linearity pattern 34 shown in FIG. 1A. The linearity pattern may provide a resistance contact that has an effect similar to having more ITO extending all around the sensing area. The linearity pattern may reduce the variations in two touch current due to touch proximity to the sensor edge.

Figure 6:
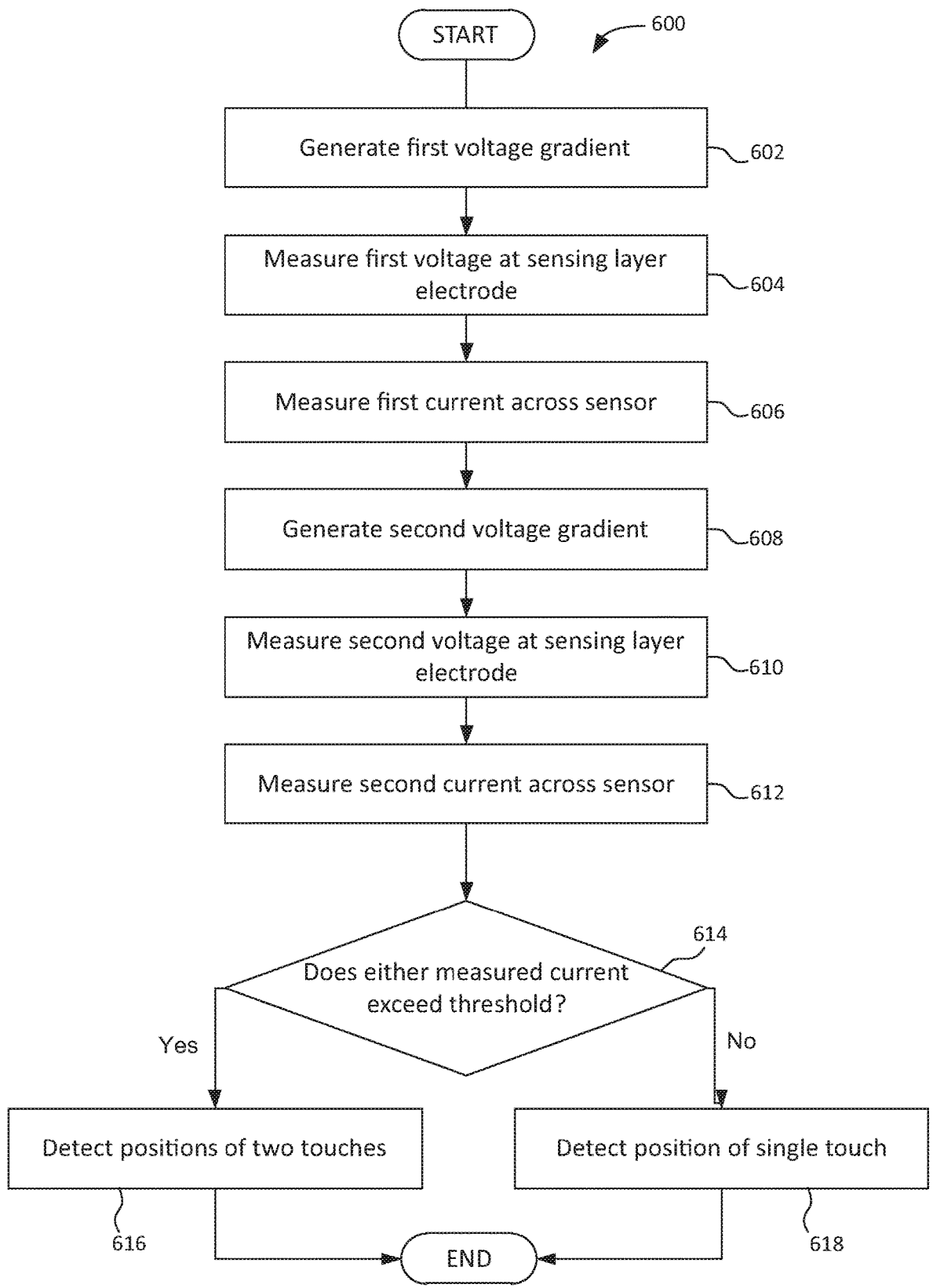
FIG. 6 is a flowchart of a method a touch sensor according to some embodiments.

FIG. 6 is a flowchart of a method 600 for determining touch positions according to some embodiments. The method 600 may be performed by the controller apparatus 300 in FIG. 3, for example. The method 600 will be described with reference to the touch sensor 100 of FIG. 2 and the controller apparatus 300 of FIG. 3, but it is to be understood that the method 600 is not limited to the particular embodiments shown in FIGS. 2 and 3.

At block 602, a first voltage gradient on an active layer of a touch sensor is generated. The first voltage gradient may, for example, be in the X-direction across the active layer 104 of the touch sensor 100 of FIG. 2. To generate the voltage gradient, the first and third ports 310a and 310c of the controller apparatus 300 of FIG. 3 may be driven high, to thereby drive the first and third electrodes 140a and 140c on one side of the touch sensor 100 high. The second and fourth ports 310b and 310d of the controller apparatus 300 of FIG. 3 may be driven low, to thereby drive second and fourth electrodes 140b and 140d on the opposite side of the touch sensor 100 low. A voltage gradient between the high and low voltage may thus be established from the first side 106 to the second side 108 of the touch sensor 100. Alternatively, the gradient may also be in the reverse direction by driving first and third electrodes 140a and 140c low and second and fourth electrodes 140b and 140d high. The first voltage gradient may be in the Y-direction instead of the X-direction.

At block 604, while the first voltage gradient is applied, a first voltage at the sensing layer is measured. For example, the voltage may be measured by measuring the voltage input at the sensing layer electrode input/output port 312 in FIG. 3, which may be connected to the sensing layer electrode 142 of the touch sensor 100 of FIG. 2.

At block 606, also while the first voltage gradient is applied, the current across the touch sensor 100, in the direction of the gradient, is measured. The term "current across the touch sensor 100" in this case refers to the current required to maintain the first voltage gradient across the active layer. For example, the voltage detector circuitry 308 of the controller apparatus 300 in FIG. 3 may measure the current flowing between the first and third active layer electrodes 140a and 140c and the second and fourth electrodes 140b and 140d.

At block 608, a second voltage gradient on a touch sensor active layer is generated. The second voltage gradient may be orthogonal to the first voltage gradient. For example, if the first voltage gradient is in the X-direction, the second voltage gradient may be in the Y-direction (vertical). In that case, the first and second ports 310a and 310b of the controller apparatus 300 may be driven high, to thereby drive first and second electrodes 140a and 140b high, and the third and fourth ports 310c and 310d may be driven low, to thereby drive third and fourth electrodes 140c and 140d low. A voltage gradient between the high and low voltage may thus be established from the top 110 to the bottom 112. Alternatively, the gradient may also be in the reverse direction (i.e., from bottom to top).

At block 610, while the second voltage gradient is applied, a second voltage at the sensing layer is measured. The voltage may be measured by measuring the voltage at the input at the sensing layer electrode input/output port 312 in FIG. 3, which may be connected to the sensing layer electrode 142 in FIG. 2.

At block 612, also while the second voltage gradient is applied, the current across the sensor, in the direction of the gradient, is measured. The term "current across the touch sensor" used herein refers to the current required to maintain the second voltage gradient. For example, the voltage detector circuitry 308 of the controller apparatus 300 in FIG. 3 may measure the current flowing between the first and second active layer electrodes 140a and 140b and the third and fourth electrodes 140c and 140d.

At block 614, the measured currents required to maintain the first and second voltage gradients are each compared to at least one respective threshold. The respective thresholds for each of the X and Y directions may differ or may be the same. Each threshold may be based on an expected current for single touch events and/or an expected current for multi-touch events. For example, the threshold(s) may be slightly higher than an expected current for a single touch event. The thresholds may be predetermined. The thresholds may be predetermined by experimentation (e.g., measuring currents for single and multi-touches and calculating the difference). If neither of the measured currents are higher than the corresponding threshold ("no" path), then the method may proceed to block 616 where a single-touch determination is performed based on the voltage measurements of blocks 604 and 610. For the single-touch determination procedure at block 616, the voltages measured in blocks 602 and 604 is used to determine an X-Y contact position in the usual manner for single touch events.

If either measured current exceeds the threshold ("yes" path), then the method may proceed to block 618 for a two-touch position determination procedure, which may follow the steps outlined below. For the two-touch determination procedure, additional steps, including measurements may be taken. An example two-touch position determination procedure is described below with reference to FIG. 7.

In some embodiments, rather than determining whether the measured current exceeds a threshold, the determination may be whether the measured current is less than a threshold. For example, the threshold may set such that currents below the threshold indicate a single touch event.

In some embodiments, the method 600 may not include the step of determining single touch position or two-touch position (blocks 616 and 618). Rather, the method 600 may instead include simply distinguishing between single and multi-touch events based on the threshold comparison at block 614. In other words, a single touch event or a two-touch event may be detected based on the thresholds. In some embodiments, measuring voltages of the sensing layer (blocks 604 and 610) may be omitted from the method of distinguishing between single and multi-touch events. Those voltages may instead be measured as part of a separate process for determining location of one or more touch contact positions before or after it is determined whether a single or multi-touch event is occurring.

As discussed above, by monitoring the currents required to maintain the voltage gradients on the active layer, a two-touch event may be distinguished from a single-touch event. The overall current increase for a two-touch event may be modest. As described above, the two touch contacts introduce the conductive coating (e.g., ITO) of the sensing layer as a second, parallel conductive path for a length roughly related to the finger spacing. This additional conductive path reduces the overall resistance across which the voltage is sustained, resulting in the modest increase in current.

The parallel conductive path includes two contact areas between the active and sensing layers, one for each finger contact, as well as the sensing layer path between the touches. The area(s) of the electrical contact between the active and sensing layers are not ideal zero-resistance contacts. These contact areas each have an electrical resistance. As a result, the current increase due to the dual touch may be less than it would be with ideal zero resistance contacts. The measurement of extra current (or reduced resistance) therefore measures the sum of the two contacts and the extra conductive path along the sensing layer. The contact resistance for each contact area between the layers may be a function of the size of the area, contact pressure, and how the finger pushes the layers together around the microdots.

Figure 7:
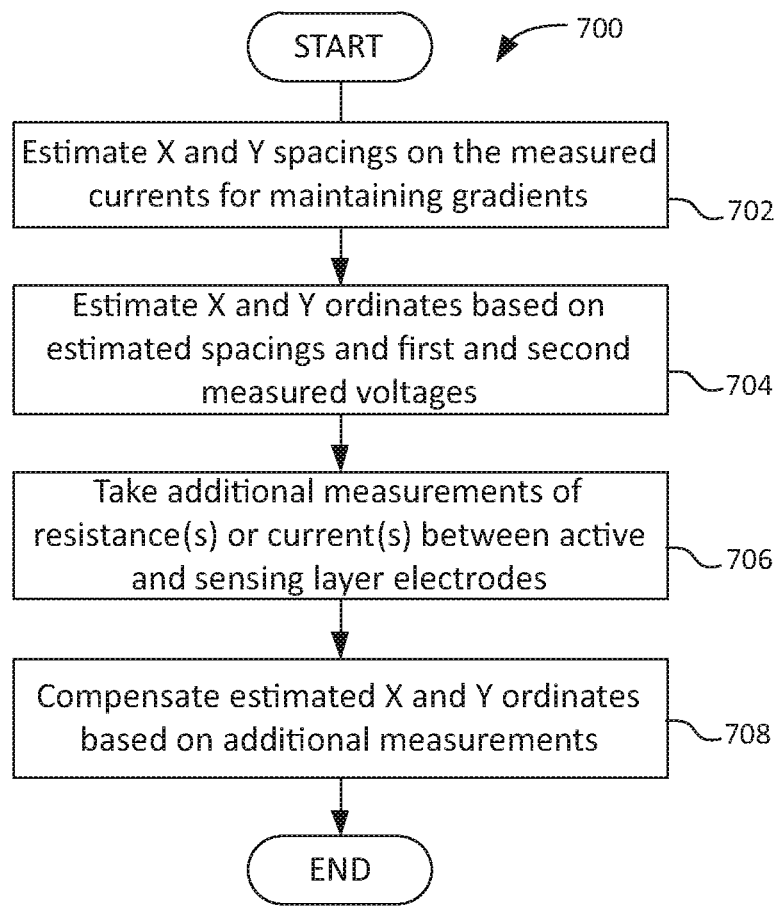
FIG. 7 is a flow chart of a method for a touch sensor according to some embodiments.

FIG. 7 is a flow chart of an example method 700 that may be used for the two-touch position determination (such as at block 618 of FIG. 6).

At block 702, approximate spacings in first and second dimensions (e.g., X and Y direction spacing) between first and second touch contact positions are calculated from the current measurements taken in blocks 606 and 612 of FIG. 6. As discussed above, the measured currents may depend on the finger spacing because the finger spacing determines the X and Y lengths of the parallel conductive path created by the dual touch. The approximate spacings may be determined based on empirical data. For example, empirical data may be gathered for a particular touch sensor configuration, and that data may later be used as the basis for estimating finger spacings. The empirical data collection may include measuring current flow for no contact and current flow for an approximate "maximum" contact (such as contact near the edges of the sensor area). A difference between these two currents may be calculated. Initial spacing estimates may, for example, be calculated as a linear function of this difference.

The accuracy of this initial spacing approximation may be adversely affected by contact resistance between the active and sensing layers, which is influenced by various factors such as size of contact areas between the layers, finger (or other object) size, touch pressure, etc. Such factors can, thus, influence the current measurements described above. Thus, one or more additional measurements described below may be utilized to compensate these initial finger spacing approximations. The one or more measurements may be made close to the same time as the voltage/current measurements described with reference to FIG. 6. The one or more additional measurements may measure resistance (or some other combination of voltage and current) that includes contributions from the same contact resistances between the layers.

At block 704, initial estimates of two X ordinates and two Y ordinates are calculated based on the X and Y spacings and the X and Y gradient voltage measurements (blocks 604 and 610 in FIG. 6). For example, the X gradient voltage measurement and the X ordinate spacing together yields two estimated X ordinates, and the same calculation may be used to determine two estimated Y coordinates. This estimate may be fairly coarse, and may be compensated or corrected in the next steps of the method 700.

Additional measurements may be useful for compensating coordinates estimated in block 704. In some embodiments, the method further includes, at block 706, taking additional current or resistance measurements and, at block 708, refining the initial estimated coordinates are refined based on additional measurements. Example processes for blocks 706 and 708 will be described in more detail below. For example, considerable information may be obtained about dual touch positions and their contact resistance by applying a voltage between the two conductive layers and measuring the total current flowing from the active layer to the sensing layer. It may also be useful to measure how much of the total current flows through each of the four corner electrodes of the active layer (e.g., electrodes 140a to 140d in FIGS. 2 to 5B and 8A to 9B). Thus, at block 706, the total contact resistance between the active layer and the sensing layer may be measured, and the coordinates may be compensated based on the contact resistance. The measured contact resistance may itself be compensated or refined based on additional measurements. For example, the measurements of individual resistances between sensing layer and each active layer electrode may be used to compensate or refine the contact resistance measurement.

Figure 8A:
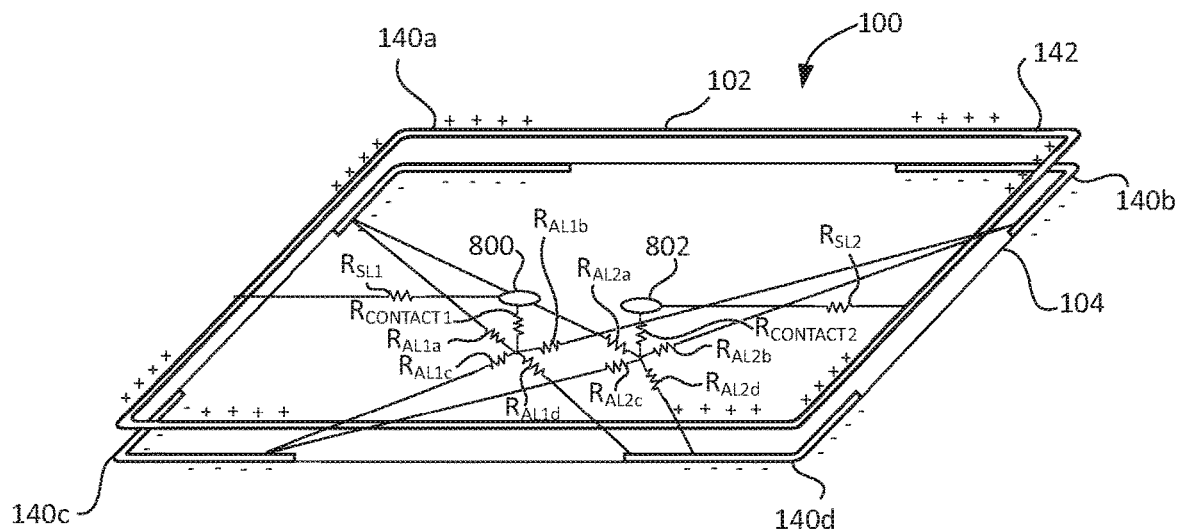
FIGS. 8A and 8B are perspective views of the touch sensor device of FIG. 2 and illustrating example resistances resulting from two touch contact positions.
Figure 8B:
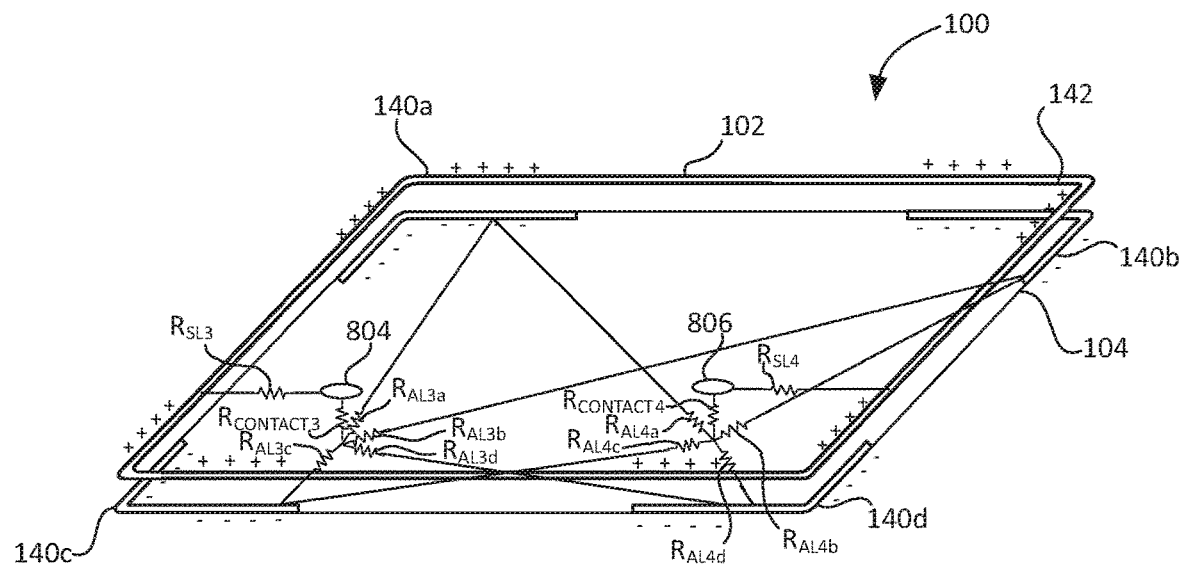

FIG. 8A illustrates a relatively close pair of contact positions 800 and 802, and FIG. 8B illustrates a relatively far pair of touch contact positions 804 and 806. FIGS. 8A and 8B illustrate various resistances and current models when all active layer electrodes are driven low and the sensing layer electrode is driven high. The total resistance (or current) is measured from the sensing layer 102. The total resistance measured to each electrode 140a to 140d and 142 depends on the contact resistance and position of both contact positions. The example resistances shown in FIGS. 8A and 8B illustrate how the total contact resistance between the drive and sensing layers may be greater for close touches (FIG. 8A) than far touches (FIG. 8B).

In FIG. 8A, the following effective resistances are illustrated in relation to the first touch contact position 800: $R_{SL1}$; $R_{CONTACT1}$; $R_{AL1a}$; $R_{AL1b}$; $R_{AL1c}$; and $R_{AL1d}$. Resistance $R_{SL1}$ is the resistance between the first touch contact position 800 and the sensing layer electrode 142. Resistance $R_{CONTACT1}$ is the contact resistance between the sensing and active layers 102 and 104 of the first touch contact position 800. Resistance $R_{EAL1a}$, $R_{AL1b}$, $R_{AL1c}$, and $R_{AL1d}$ are, respectively, the resistances of the active layer between the first touch contact position 800 and each of the four active layer electrodes 140a to 140d. The following effective resistances are illustrated in relation to the second touch contact position 802: $R_{SL2}$; $R_{CONTACT2}$; $R_{AL2a}$; $R_{AL2b}$; $R_{AL2c}$; and $R_{AL2d}$. Resistance $R_{SL2}$ is the resistance between the second touch contact position 802 and the sensing layer electrode 142. Resistance $R_{CONTACT2}$ is the contact resistance between the sensing and active layers 102 and 104 of the second touch contact position 802. Resistance $R_{AL2a}$, $R_{AL2b}$, $R_{AL2c}$, and $R_{AL2d}$ are, respectively, the resistances of the active layer between the second touch contact position 802 and each of the four active layer electrodes 140a to 140d.

A total active layer resistance "$R_{AL1}$" for the first touch contact position 800 may be estimated as the sum of: $R_{EAL1a}$, $R_{AL1b}$, $R_{AL1c}$, and $R_{AL1d}$. A total active layer resistance "$R_{AL2}$" for the second touch contact position 802 may be estimated as the sum of: $R_{AL2a}$, $R_{AL2b}$, $R_{AL2c}$, and $R_{AL2d}$. The total resistance between the first touch contact position 800 and the second touch contact position 802 may then be estimated as:

$$R_{TOTAL\_CLOSE} = R_{SL1} + R_{CONTACT1} + R_{AL2} + R_{SL2} + R_{CONTACT2} + R_{AL2}$$

FIG. 8B illustrates third and fourth touch contact positions 804 and 806, which are considerably farther apart than the touch contact positions 800 and 802 in FIG. 8A. In FIG. 8B, the following resistances are illustrated: $R_{SL1}$; $R_{CONTACT3}$; $R_{AL3a}$; $R_{AL3b}$; $R_{AL3c}$; $R_{AL3d}$; $R_{SL4}$; $R_{CONTACT4}$; $R_{AL4a}$; $R_{AL4b}$; $R_{AL4c}$; and $R_{AL4d}$. Resistance $R_{SL3}$ is the resistance between the third touch contact position 804 and the sensing layer electrode 142. Resistance $R_{CONTACT3}$ is the contact resistance between the sensing and active layers 102 and 104 of the third touch contact position 804. Resistance $R_{EAL3a}$, 1 $R_{AL3b}$, $R_{AL3c}$, and $R_{AL3d}$ are, respectively, the resistances of the active layer between the third touch contact position 804 and each of the four active layer electrodes 140a to 140d. Resistance $R_{SL4}$ is the resistance between the fourth touch contact position 806 and the sensing layer electrode 142. Resistance $R_{CONTACT4}$ is the contact resistance between the sensing and active layers 102 and 104 of the fourth touch contact position 806. Resistance $R_{AL4a}$, $R_{AL4b}$, $R_{AL4c}$, and $R_{AL4d}$ are, respectively, the resistances of the active layer between the fourth touch contact position 806 and each of the four active layer electrodes 140a to 140d.

A total active layer resistance "$R_{AL3}$" for the third touch contact position 804 may be estimated as the sum of: $R_{EAL3a}$, $R_{AL3b}$, $R_{AL3c}$, and $R_{AL3d}$. A total active layer resistance "$R_{AL4}$" for the fourth touch contact position 806 may be estimated as the sum of: $R_{AL4a}$, $R_{AL4b}$, $R_{AL4c}$, and $R_{AL4d}$.

The total resistance between the third touch contact position 804 and the fourth touch contact position 806 may then be estimated as:

$$R_{TOTAL\_FAR} = R_{SL3} + R_{CONTACT3} + R_{AL3} + R_{SL4} + R_{CONTACT4} + R_{AL4}$$

The resistance to the various electrodes may decrease as the touch contact position moves closer to the edges of the touch sensor (i.e., closer to the electrodes). Thus, in the example of FIGS. 8A and 8B, the resistances $R_{SL3}$, $R_{AL3}$, $R_{SL4}$, and $R_{AL4}$ may be much less than $R_{SL1}$, $R_{AL1}$, $R_{SL2}$, and $R_{AL2}$. Thus, the total resistance $R_{TOTAL\_FAR}$ between the relatively far apart third and fourth touch contact positions 804 and 806 may be much less than the total resistance $R_{TOTAL\_CLOSE}$ between the relatively close first and second touch contact positions 800 and 802.

Figure 9A:
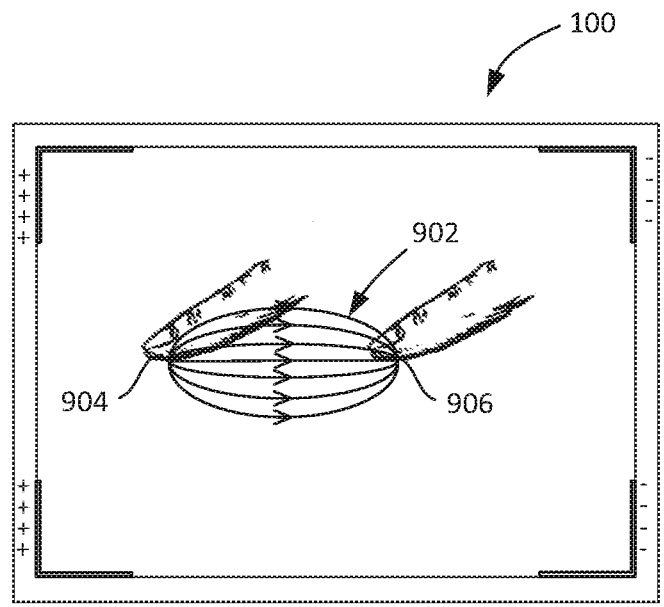
FIGS. 9A and 9B are top views of the touch sensor of FIG. 2 and illustrating example current flow paths in the sensing layer.
Figure 9B:
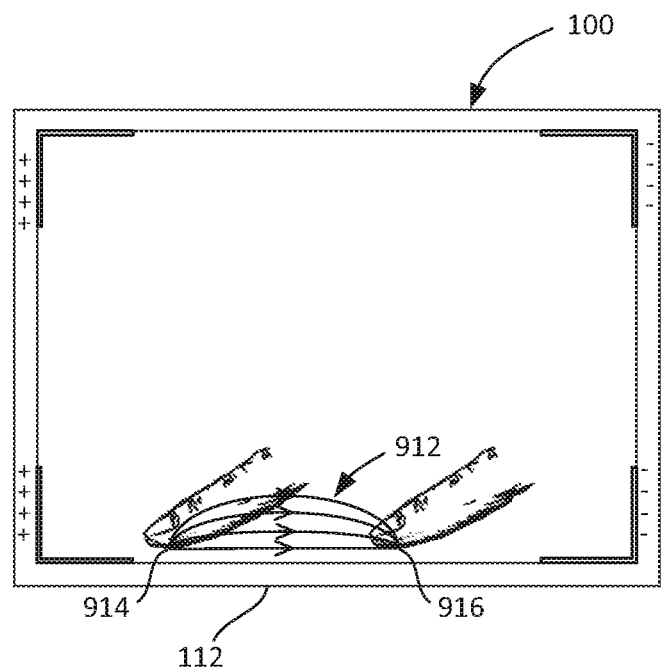

The extra current path created by two contact positions may be weaker when the contact positions are very close to the edge of the active and sensing layers. This is because the current between two touches through the conductive surface of the sensing layer does not follow a simple straight line, but instead is distributed over a somewhat elliptical area of the conductive layer that encompasses the two touch contacts. FIG. 9A illustrates an example current path 902 for a pair of touch contact positions 904 and 906 far from the edges of the touch sensor 100. In FIG. 9A, the current in the sensing layer is relatively unconstrained. By contrast, FIG. 9B illustrates an example current path 912 for a pair of touch contacts 914 and 916 near the bottom edge 112 of the touch sensor 100. As shown, the current path 912 is partially constrained (i.e., truncated or reduced) by the bottom edge 112. If a significant amount of the potential area for current flow is cut off, then the path between fingers has a slightly higher resistance.

FIGS. 10A to 10D are perspective views of the touch sensor 100 and illustrate an example of the electrodes 140a to 140d and 142 being sequentially driven for four individual measurements of sensing layer resistance.

Figure 10A:
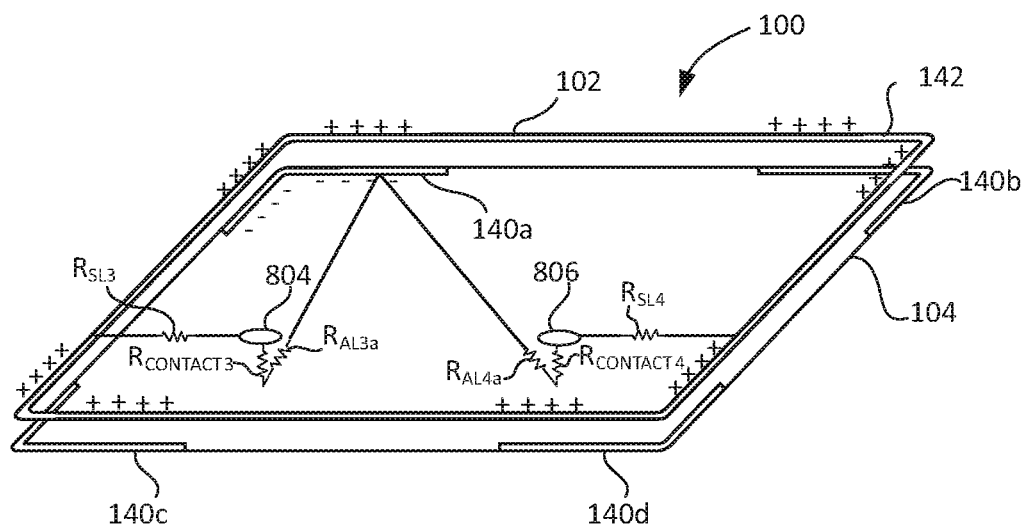
FIGS. 10A to 10D are perspective views of the touch sensor device of FIG. 2 and illustrating individual resistances between the active layer electrodes and the second layer electrode.
Figure 10B:
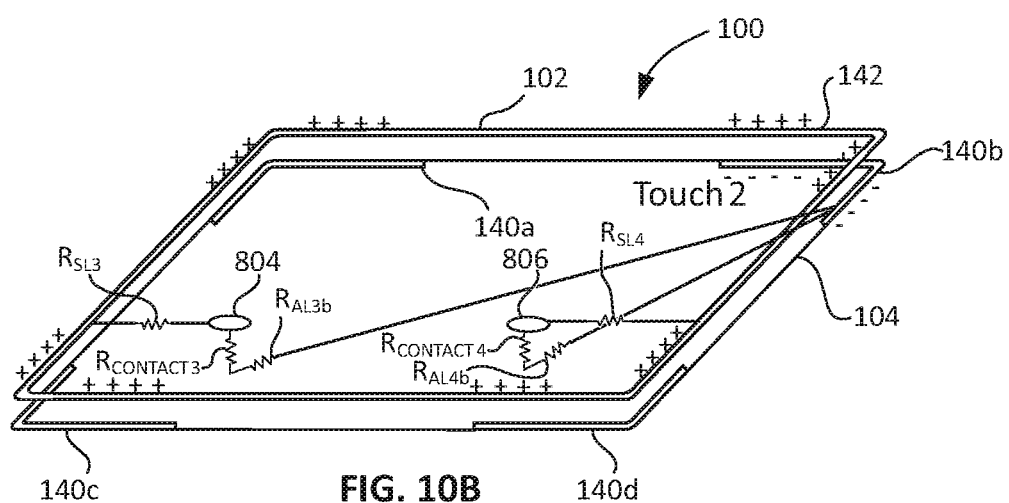
Figure 10C:
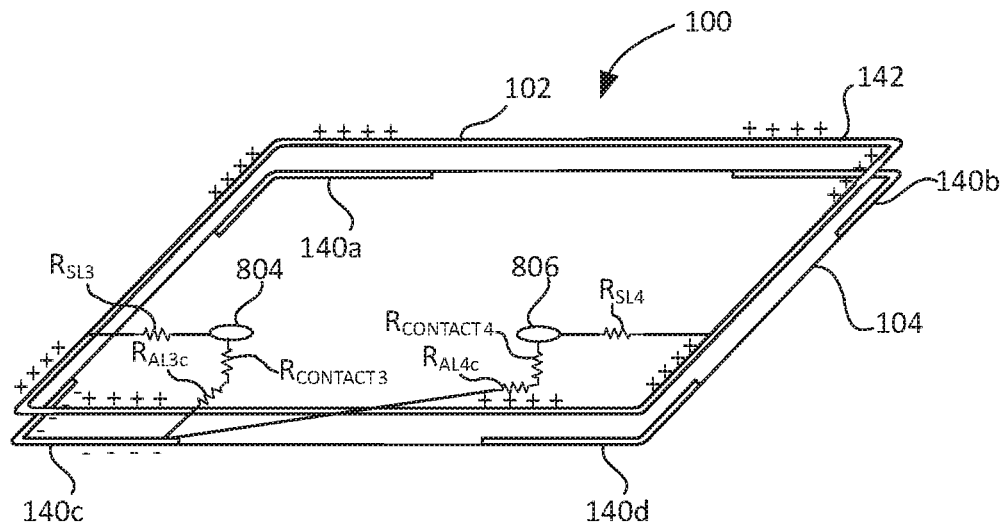
Figure 10D:
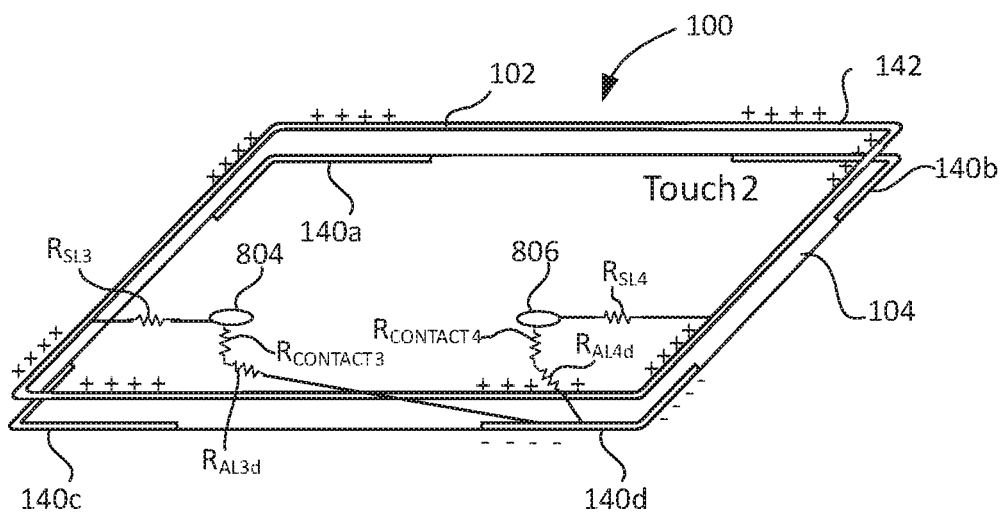

In FIGS. 10A to 10D, the third and fourth touch contact positions 804 and 806 are the same far apart positions of FIG. 8B. FIGS. 10A to 10D each show the sensing layer electrode 142 driven high. The active layer electrodes 140a to 140d are sequentially and individually driven low in FIGS. 10A to 10D, respectively. Thus, in each of FIGS. 10A to 10D, the third touch contact position 804 sees $R_{SL3}$ and $R_{AL3}$, and the fourth touch contact sees $R_{SL4}$ and $R_{CONTACT4}$. When the first active layer electrode 140a is driven low (FIG. 10A), the third touch contact position 804 also sees the resistance $R_{AL3a}$ to the first electrode 140a, and the fourth touch contact position 806 sees the resistance $R_{AL4a}$ to the first electrode 140a. FIGS. 10B, 10C and 10D similarly show the individual resistances to the second, third and fourth electrodes 140b to 140d.

The finger contact resistance may be determined almost independently when the fingers are far apart as the conductive layer resistance between the fingers is relatively significant. The contact resistance of each touch contact position may be strongly contact circumference dependent.

The current measured may give a total resistance result from or to each node. This is particularly the case when a touch contact is fairly light, and, thus, the circumference of that touch can be small and the resistance to current flowing to and from that small contact area can be very significant relative to the resistance of a current path in a single conductive layer.

Figure 11A:
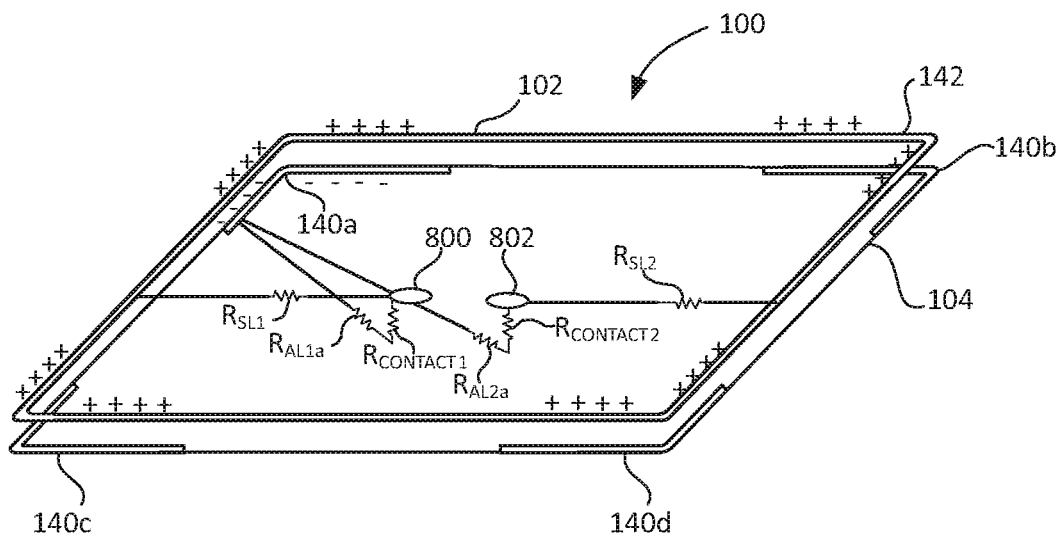
FIGS. 11A to 11D are additional perspective views of the touch sensor device of FIG. 2 and illustrating individual resistances between the active layer electrodes and the second layer electrode.
Figure 11B:
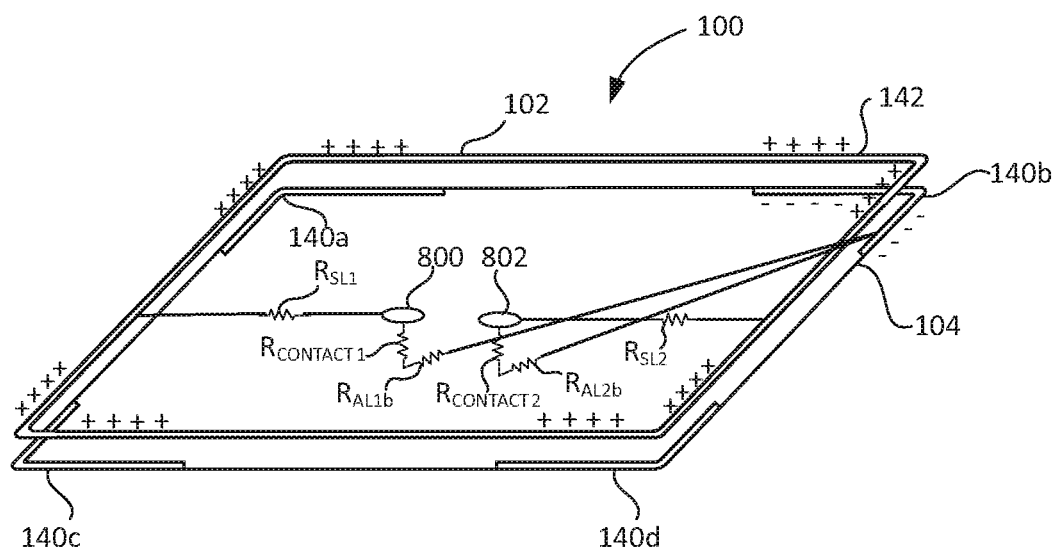
Figure 11C:
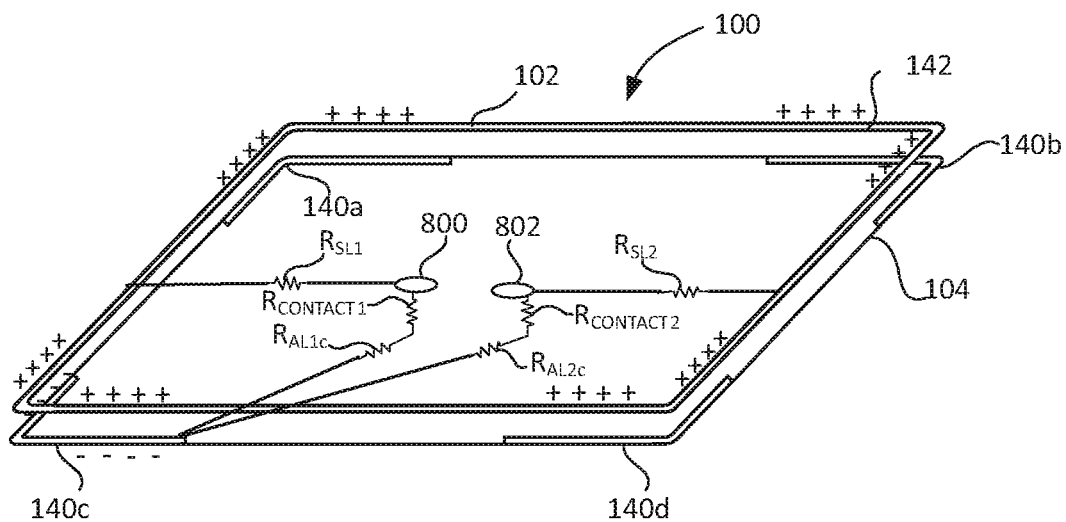
Figure 11D:
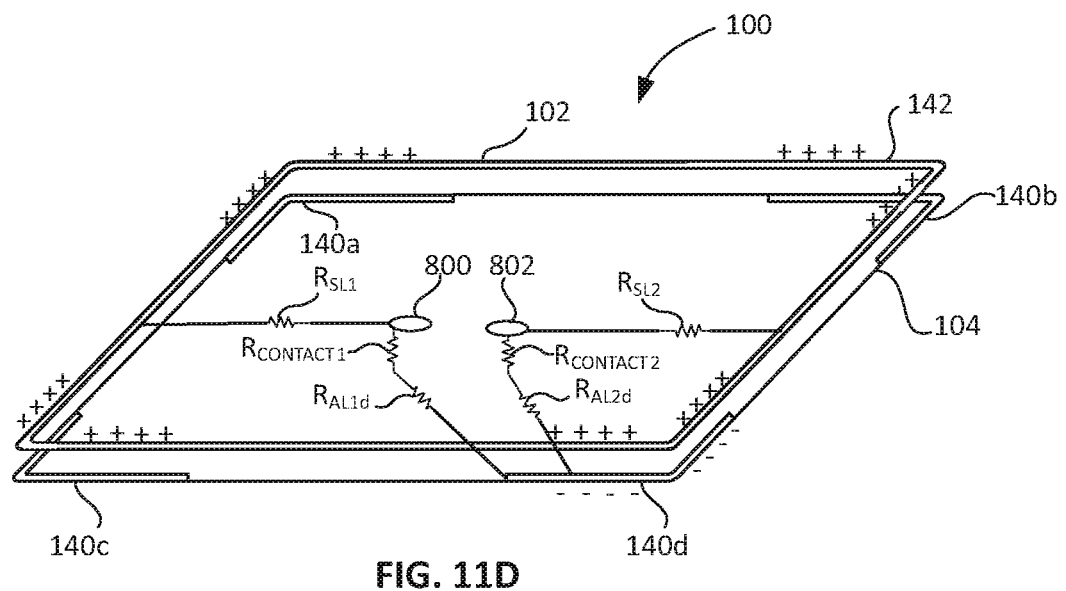

FIGS. 11A to 11D are perspective views of the touch sensor 100 and illustrate an example of the electrodes 140a to 140d and 142 being sequentially driven for four individual measurements of sensing layer resistance. In FIGS. 11A to 11D, the touch contact positions 800 and 802 are the same close together positions of FIG. 8A. FIGS. 11A to 11D each show the sensing layer electrode 142 driven high. The active layer electrodes 140a to 140d are sequentially and individually driven low in FIGS. 11A to 11D respectively. Thus, in each of FIGS. 11A to 11D, the first touch contact position 800 sees $R_{SL1}$ and $R_{AL1}$, and the second touch contact position 802 sees $R_{SL2}$ and $R_{CONTACT2}$. When the first active layer electrode 140a is driven low (FIG. 10A), the first touch contact position 800 also sees the resistance $R_{AL1a}$ to the first electrode 140a, and the fourth touch contact position 806 sees the resistance $R_{AL2a}$ to the first electrode 140a. FIGS. 11B, 11C and 11D similarly show the individual resistances to the second, third and fourth electrodes 140b to 140d.

When touch contact positions are relatively close together, the contact resistance variations can be larger than the conductor coating resistance separating them. Thus, the lower resistance contact position may dominate the current flow regardless of which active layer electrode is currently driven. However, for each active layer electrode, when driven, the current to the sensing layer may be based on an equation that has common variables. Using simultaneous equation analysis, the small variations may be resolved to determine the contact resistance of each of the two fingers (possibly with reduced accuracy). This simultaneous equation analysis may allow the location distortion effect of varying contact pressure which map to finger contact resistance variations to be at least partially compensated for.

Figure 12:
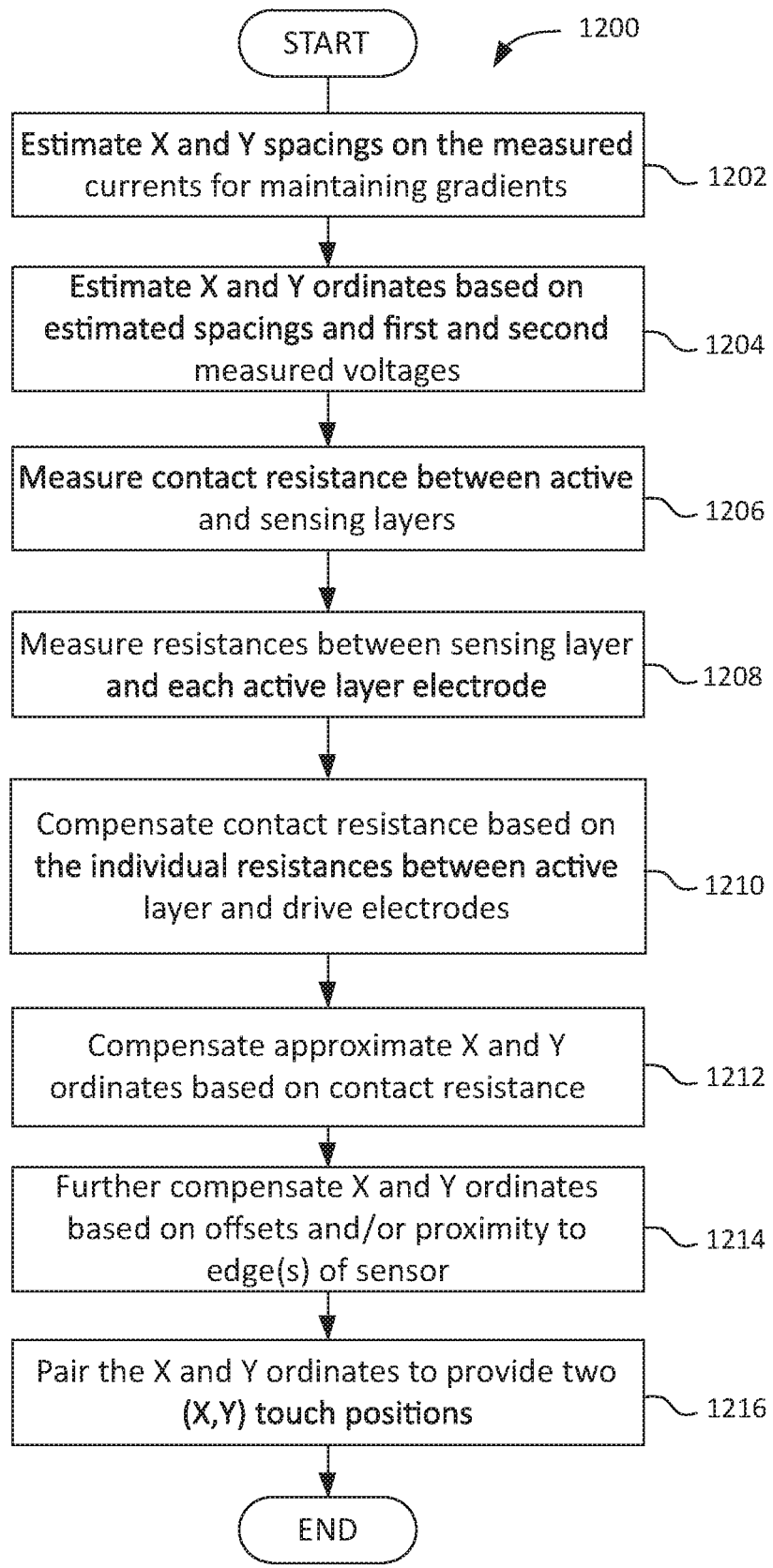
FIG. 12 is a flow chart of another method for a touch sensor according to some embodiments.

FIG. 12 is a flowchart of another method 1200 for determining two-touch contact positions according to some embodiments.

At block 1202, approximate spacings in first and second dimensions (e.g., X and Y direction spacing) between first and second touch contact positions are calculated. At block 1204, initial estimates of two X ordinates and two Y ordinates are calculated based on the X and Y spacings and the X and Y gradient voltage measurements (blocks 604 and 610 in FIG. 6). Blocks 1202 and 1204 are similar to blocks 702 and 704 in FIG. 7.

Blocks 1206 to 1216 show examples of extra measurements and compensation of the estimated X and Y ordinates that may be performed.

At block 1206, the contact resistance between the conductive coatings of the active and sensing layers is measured or approximated. This step may comprise measuring a resistance between the sensing layer electrode of the sensing layer and all four driving electrodes of the active layer, collectively, which are effectively connected together electrically. The bulk of this measurement represents the contact resistance between the active and sensing layers during the dual-touch. The measurement may be obscured slightly by factors such as: varying spacing of the touches; the distance between the contacts and the four driving electrodes; and the distance between the contacts and the sensing layer electrode(s) of the sensing layer. Nevertheless, this measurement may give a reasonable approximation of the sum of the contact resistances.

At block 1208, the individual resistances between the sensing layer and each of the four driving electrodes of the active layer are measured. This may comprise four separate measurements, one for each driving electrode. The differences between these measurements may indicate how "offset" the actual dual-touch is from a "reference dual-touch." The "reference dual-touch" in this case is a pre-defined value for a typical centered dual-touch and may be selected near the decision between one touch and two touches. A decision point for the touch sensor is where fingers are quite close together at the threshold of being reported as one touch or two. This threshold may be approximately 2 cm spacing, for example. This may a) avoids erroneously declaring two touches when there is really one (perhaps forceful big flat) finger; and/or b) allow the touch sensor to be used with reasonably closely spaced dual touch. This may be particularly useful, for example, when the operator wants to zoom in a great deal on a map.

These measurements may be useful to help compensate for the extent to which the contact resistance measurement is distorted by dual touch that is substantially a) offset toward an edge or corner of the touch area or b) includes very closely spaced or very widely spaced dual contacts.

At block 1210, optionally, the four individual measurements of sensing layer resistance to the active layer electrodes (taken at block 1208) are used to compensate the measurement of overall contact resistance between the two conductive surfaces for the approximate amount of increased or decreased conductive surface distance through which current flows during the overall measurement. This compensation may at least partially correct for the issues illustrated in FIGS. 8A to 9B.

The specific compensating amounts and methods may vary depending on the specific characteristics of the touch sensor. For example, the sensing area, dimensions of the air gap, the spacing and size of the microdots, the flexibility of the upper layers, plus the resistivity of the conductive layer coatings which applies linearizing sensor patterns, may greatly affect how the finger contact resistances may vary relative to the position associated resistances. This in turn may change what approximations may best be made to determine finger position, separation and relative angle between the fingers to sufficient accuracy.

The imbalance in the four individual electrical currents that make up the total current between conductive layers may be assessed and taken into account. Known average positions of a dual touch contacts and rough finger spacings in X and Y from raw active layer current measurements may also be taken into account. The measurement of contact resistance between the conductive layers may be compensated for the additional resistance along the two conductive layers between the electrodes and the contact positions (which vary with contact position). These factors and compensations may be empirically determined based on the particular touch sensor design (geometry, material composition, construction etc.).

The compensation may be based on a reference point that is an estimate of a two-touch contact with one or more of the following characteristics: spacing at the threshold between detecting single and dual touch; located near the middle of the touch sensor area; and with a balanced pressure between the two touches. Two-touch contact positions spaced by the "decision point" and with balanced pressure between the two touches would, in theory, have their contact resistance measurements restored to the values they would have for dual touches near a middle of the touch sensor area. Resistive touch sensors may have a minimum touch force at which they operate because of the pressure required to make sufficient electrical contact between the conductive layers. The same holds true for two-touch events. Minimum touch pressure may be applied to make electrical contact. At pressures above this minimum, raw contact resistance measurements may be adjusted to (or close to) the values they would have if the touches were near the touch sensor center.

At block 1212, the approximate X and Y ordinates calculated at block 1202 are compensated or revised based on the contact resistance. If blocks 1208 and 1210 are omitted, then the compensation may be based solely on the contact resistance measured at block 1206. If blocks 1208 and 1210 are included, then the compensation of the X and Y ordinates is based on the compensated contact resistance calculation at block 1210.

At block 1214, optionally, the compensated sets of X and Y ordinates are further compensated for proximity of the X and Y ordinates to edges of the sensor and/or for X or Y ordinate offsets. Inaccuracy may arise when the two contacts are offset from one another in the X and Y axes or (also optionally) very close to an edge of the conductive surface. The "offset" of relative to the X-direction spacing refers to the contact spacing in the Y-direction (and vice versa) in this context. The offset in the Y-direction may result in a perceived shorted spacing in the X-direction. If, for example, the offset (in the opposite axis) is beyond approximately 20% of the spacing being measured, the effect may become significant. At block 1216, the compensated X ordinates and the compensated Y coordinates are paired to provide two contact (X,Y) positions. That is, one X ordinate is paired with a corresponding Y ordinate to yield a first contact (X,Y) coordinate position. The other X ordinate is paired with the other Y ordinate to yield a second contact (X,Y) coordinate position.

In many cases, once the X and Y ordinates are calculated, making the correct pairing may be relatively straightforward. For example, if one touch is in progress when a second touch is added, it may be clear how the two ordinates in each axis should be paired. The X and Y ordinates closest to the ongoing touch may remain one pair, while the two other (new) X and Y ordinates may become the second pair. This concept is illustrated in FIGS. 13A and 13B.

Figure 13A:
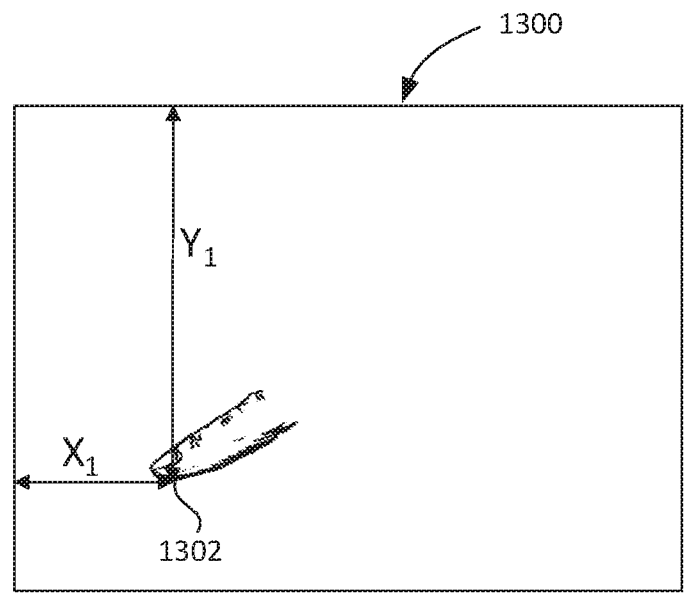
FIGS. 13A and 13B illustrate X and Y ordinates of example touch contact positions.
Figure 13B:
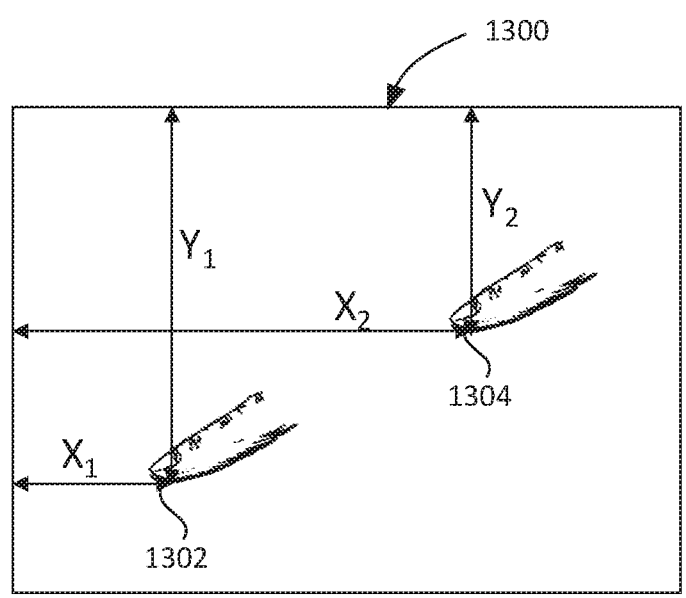

In FIG. 13A, a first touch contact position 1302 on a touch sensor device 1300 is illustrated with first X and Y coordinates (X1 and Y1). FIG. 13B shows a second touch contact position 1304 that has been added (in addition to the first touch contact position 1302). When the change from one-touch to two-touch is determined, the controller (e.g., controller apparatus 300 in FIG. 3) may determine that the first X and Y ordinates X1 and Y1, or close variations of such, are still detected. Thus, the controller may determine that the first touch contact position 1302 is still ongoing, and the other ordinates X2 and Y2 are paired to give the second touch position. In some embodiments, IF ONE contact position was previously detected and a second contact position is added, the approximation of the first contact position may be adjusted to remain in the original first detected position (which may be more accurate than the position approximation immediately subsequent to the second contact being added.

Figure 14A:
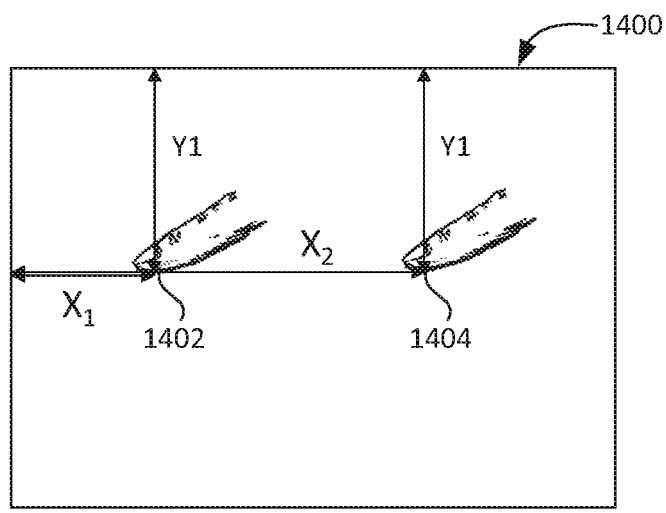
FIG. 14A to 14C illustrate X and Y ordinates of other example touch contact positions.

Similarly, if two touches are ongoing, continuity and proximity may identify how two freshly-determined ordinates in the X axis should be paired with two freshly-determined ordinates in the Y axis. In some cases, X and Y ordinates are obtained that are "overlapping," meaning that both ordinates in one axis are identical or almost identical. In such cases, the pairing may be difficult to discern, but there may be no need to do so. Since both ordinates in one axis are the same, it may not matter how they are assigned as pairs with the ordinates in the other (non-overlapping) axis. This concept is illustrated in FIG. 14A, which shows touch sensor 1400. In FIG. 14A, two touch contact positions 1402 and 1404 have different X ordinates (X1 and X2) but roughly the same Y ordinate (Y1). In this case, either possible pairing of the X and Y ordinates results in results in roughly the same two touch contact positions 1402 and 1404.

Figure 14B:
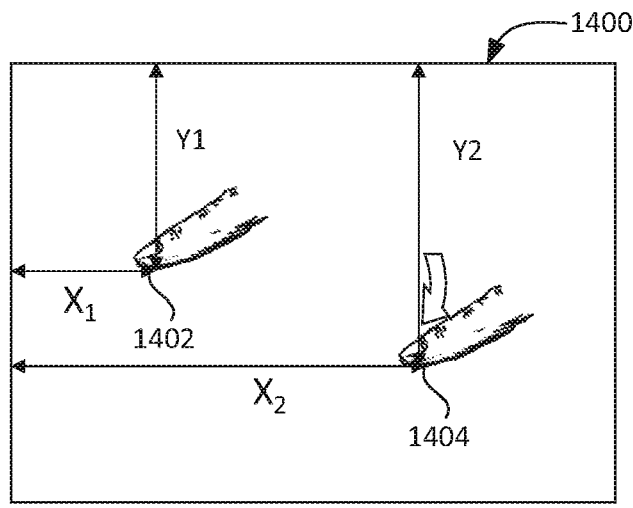
Figure 14C:
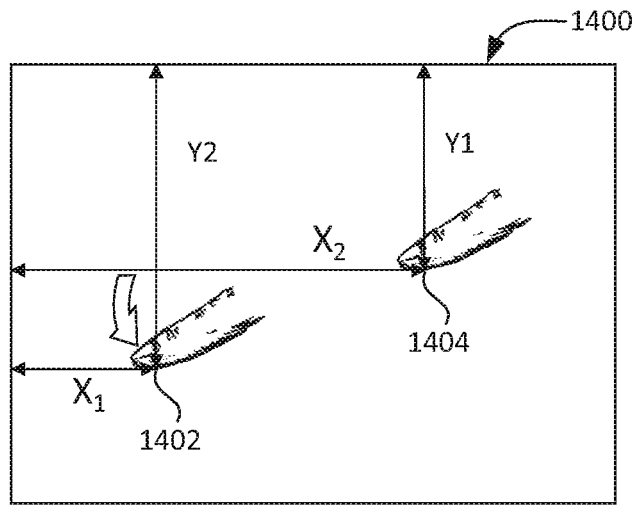

In some cases, touch history and timing may not reveal how the two X and two Y ordinates should be paired. This may happen for example when two touches start simultaneously or so near simultaneously so that the first touch is not sufficiently identified before second touch occurs. Similarly, there may be uncertainty about pairing when two touches are moving and are just emerging from an "overlap." This situation is shown in FIGS. 14B and 14C, which illustrate two alternative possible moves from the Y-axis overlap of FIG. 14A. FIG. 14B shows an example of the second touch contact position 1404 moving down in the Y-direction (with the first touch contact position 1402 remaining in the same position as FIG. 14A). FIG. 14C shows the first touch contact position 1402 moving down in the Y-direction (with the second touch contact position 1404 remaining in the same position as FIG. 14A). Both alternative possibilities have the same sets of X ordinates (X1, X2) and Y ordinates (Y1, Y2). Obtaining the two sets of ordinates in this scenario may not provide enough information to determine how these ordinates should be paired. In such cases, additional information may be gathered to determine how the four ordinates should be paired to create correct touch coordinates.

Figure 15A:
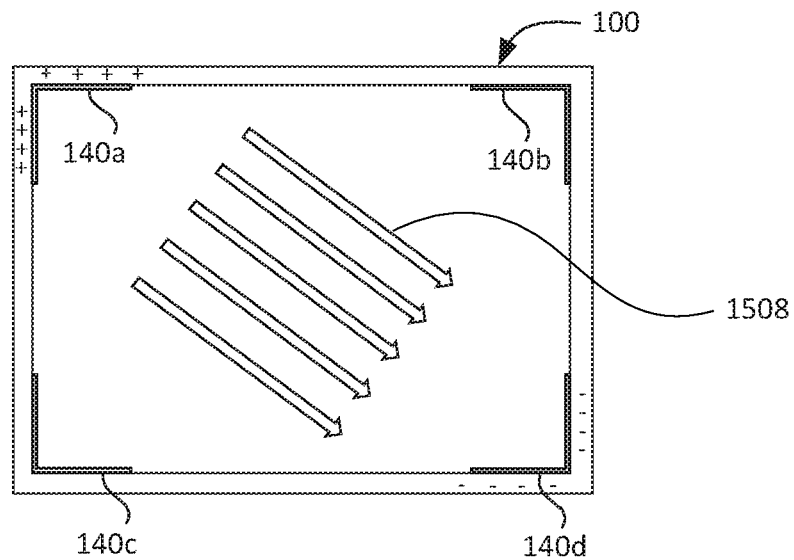
FIGS. 15A to 15D are top views of the touch sensor of FIG. 2 illustrating diagonal voltage gradients that may be used to pair X and Y ordinates.
Figure 15B:
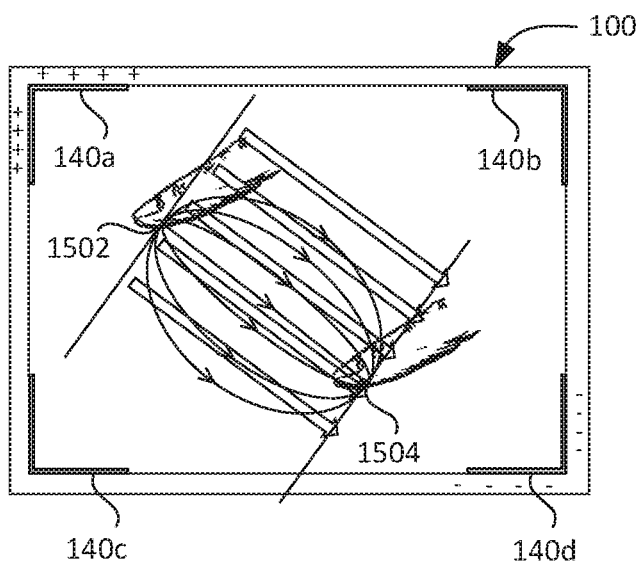

In some embodiments, in order to pair the X and Y ordinates in (block 1216 of FIG. 12), measurements of diagonal (corner-to-corner electrode) current or resistance are taken and compared to each other. By way of example, a resistance or current measurement may be taken while a voltage gradient is applied from the upper left to lower right corner electrode of the active layer—a physically "downward" diagonal voltage gradient. See, for example FIG. 15A, which shows an example diagonal voltage gradient (in the direction indicated by arrows 1402) on the touch sensor 100 of FIG. 2. The first active layer electrode 140a is driven high and the fourth active layer electrode 140d (in the opposite corner) is driven low. The resistance or current between the first and fourth electrodes 140a and 140d is measured. FIG. 15B shows an example current path 1506 in the sensing layer between two exemplary touch contact positions 1502 and 1504 when the gradient of FIG. 15A is applied.

In some embodiments, the measurements taken in blocks 1206 and 1208 of the method of FIG. 12 may be the initial measurements used to estimate touch position, and the measurements taken from blocks 602 to 612 of FIG. 6 may instead be used for compensating or revising those initial estimations. The steps taken in block 1216 for pairing the X and Y ordinates may still be performed.

Figure 15C:
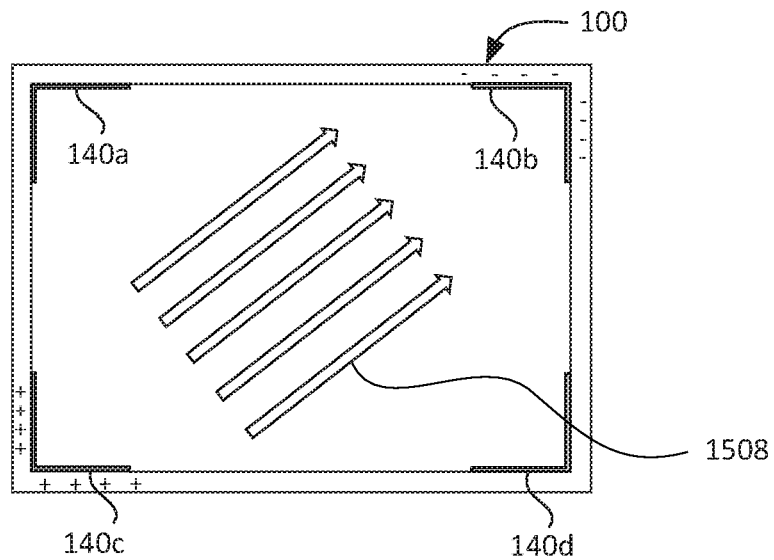
Figure 15D:
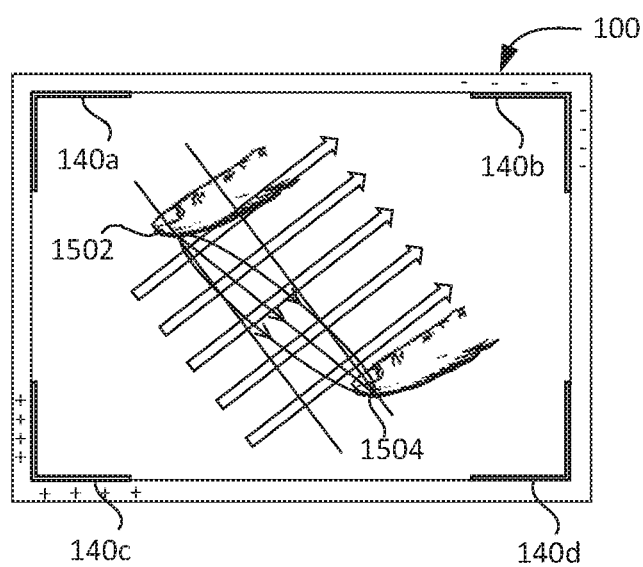

Next, a similar resistance (or current) measurement may be taken while a voltage gradient is applied from the lower left to upper right corner electrode of the active layer—a physically "upward" diagonal voltage gradient. See, for example FIG. 15C, which shows another example diagonal voltage gradient (in the direction indicated by arrows 1508) on the touch sensor 100 of FIG. 2. The third active layer electrode 140c is driven high and the second active layer electrode 140b (in the opposite corner) is driven low to create the gradient. The resistance or current between the first and fourth electrodes 140a and 140d is measured. FIG. 15D shows the current path 1506 with the gradient of FIG. 15C is applied.

As seen from FIGS. 15B and 15D, the component of the current path 1506 that is generally parallel with the downward diagonal gradient (FIG. 15B) is much larger than the component of the current path 1406 that is generally parallel to the upward diagonal gradient (FIG. 15D). Thus, a greater amount of current may flow in FIG. 15B. The controller may determine the X and Y ordinate pairings based on this detected asymmetry. Turning again to the example in FIG. 15B, the touch contact positions 1502 and 1504 would provide a greater current in an upper left to lower right diagonal gradient than in a lower left to upper right voltage gradient.

Additional techniques may be applied to improve the reliability of the measurement and pairing decision. These techniques may be applied modestly and computationally efficiently such that touch sensor touch position responsiveness remains acceptable to the operator. Such techniques may include: averaging of multiple measurements to improve signal to noise ratio, possibly requiring that a margin is exceeded before making a decision to change state (hysteresis), applying ongoing tracking of baseline values, normalizing measurements with different scales to make comparison meaningful and possibly requiring that a series of measurements show consistency in their results before a decision is made to change state. These and other numerical and measurement techniques may be applied to ensure that touch coordinate pairing is performed reliably and quickly.

The X and Y current (or resistance) measurements made to determine finger spacing may be partially obscured by an additional factor beyond contact resistances between the conductive surfaces. Consider a dual touch finger spacing in the x-direction that introduces an extra current conducting path into the active layer voltage gradient in the x direction. The amount of resistance change introduced by this path is dependent upon the length of the path, as discussed above. However, the resistance change for the X-gradient measurement may also be somewhat dependent upon the Y offset (y axis spacing) of the two touches, and vice versa. For example, two touches spaced by say 5 cm in the X axis with 0 cm offset in the Y axis may introduce a more conductive path compared to two touches spaced by the same 5 cm in the X axis with 10 cm spacing in the Y axis direction.

When dual touches share the same (or very nearly the same) ordinate in one axis, diagonal current measurements may not yield sufficiently different results to allow a pairing decision with sufficient certainty. Fortunately, since the contacts share a common value in one axis, it may not be necessary to make a pairing decision to yield positions that are numerically correct. The measurements may be repeated over 100 times per second so a correct pairing decision may be made as the finger contact positions become distinguished in both axes.

Mathematically exact compensation relationships can be somewhat computationally intensive and time consuming to calculate. It may be desirable for touch sensor to be able to report touch position measurements/samples at a high rate (e.g., more than one hundred times per second). Thus, there may be a trade-off between contact position accuracy and sample rate. While using a more powerful computational device may help lessen the trade-off between accuracy and sample rate, cost may be increased. A possibly preferable alternative is to employ a simpler (smaller, less power-consuming and less costly) computational device and implement computationally simple yet empirically accurate approximations.

The position calculation process may involve a limited number of iteration cycles where an estimate for a resistive element value is fed back into the next estimation. Although such iteration adds to the steps taken, if this allows the estimation steps to be simplified sufficiently, the overall calculation complexity may be reduced.

Two-touch contacts are often used primarily for gestures, such as pinch, zoom, rotate, etc. The user may learn how the touch sensor responds to his/her gestures. For pinches (zoom in) and zooming out, the precise amount of registered pinch and zoom per finger motion may not need to precisely match the finger movements, so long as it is reasonably close and consistent. Ease of use may be more important than precision to users in some implementations. Similarly, for rotations, the rotation angle may not need to precisely match the true angle or rotation of the two fingers.

Accuracy may become more important in some situations, such as when touches are quite closely spaced—near the threshold of where the decision is made to report two touches or one touch. It may be desirable to a) avoid reporting two touches when there is actually only one touch (unless that touch becomes unreasonably large—like a deliberate flat thumbprint) and b) begin to indicate two touches when the dual touch takes place, even while the fingers are still quite close together.

Figure 16:
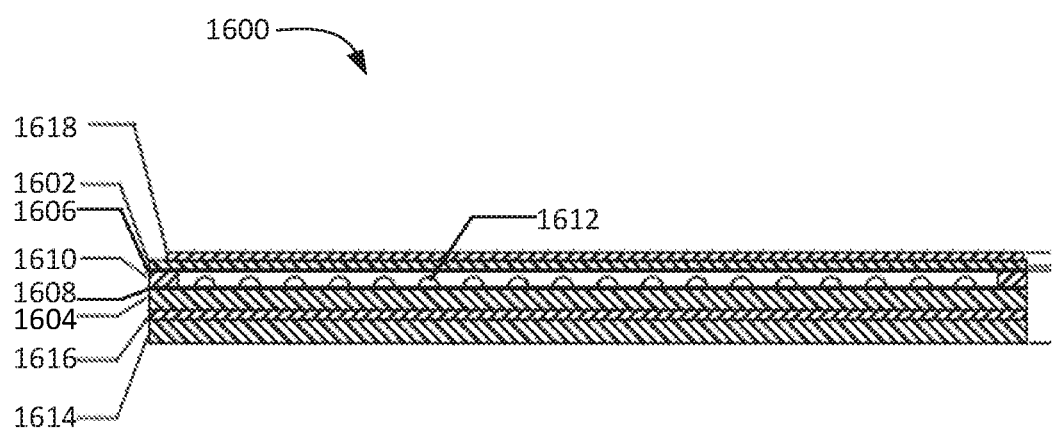
FIG. 16 is a side cross-sectional view of another example resistive touch sensor.

FIG. 16 is a side cross-sectional view of a touch sensor 1600 according to some embodiments. The touch sensor 1600 includes a first (active) layer 1602, and a second (sensing) layer 1604 spaced from the first layer. The first active layer 1602 in this example comprises a first conductive coating 1606, and the second sensing layer 1604 comprises a second conductive coating 1608. The first and second conductive coatings are each ITO in this embodiment. The first and second layers 1602 and 1604 may, thus, simply be referred to herein as first and second "conductive" layers, although only the coatings 1606 and 1608 form conductive portions of the first and second layers 1602 and 1604. The first active layer 1602 comprises polyester with the first conductive coating 1606 thereon, and the second sensing layer 1604 comprises glass with the second conductive coating 1608 thereon. The touch sensor 1600 further comprises a spacer adhesive 1610 and spacer dots 1612 maintaining the separation between the first and second layers 1602 and 1604.

The touch sensor 1600 further includes a chemically strengthened glass substrate layer 1614 for structural support that is bonded to the back surface of the second sensing layer 1604 by a bondline layer 1616. A protective layer 1618, which comprises borosilicate glass in this example, is attached to the front surface of the first active layer 1602.

The touch sensor 1600 may also include five electrodes configured similar to the electrodes 140a to 140d and 142 of the embodiment in FIG. 2. The methods described herein may be implemented using the touch sensor 1600 of FIG. 16. However, embodiments are not limited to the particular configuration of layers and/or the specific example materials of the touch sensor 1600 of FIG. 16.

A touch sensor system may include a touch sensor, such as the touch sensors 100 or 1600 shown in FIG. 2 or FIG. 16 and a controller configured to implement the methods described herein, such as the controller apparatus 300 of FIG. 3.

A method for a touch sensor according to some embodiments may include receiving a voltage output from an one electrode of the touch sensor; amplifying a difference between a baseline voltage and the voltage output of the corresponding electrode; and generating a detector output as a function of the amplified difference, as described above with reference to FIG. 18.

It is to be understood that a combination of more than one of the approaches described above may be implemented.

Embodiments are not limited to any particular one or more of the approaches, methods or apparatuses disclosed herein. One skilled in the art will appreciate that variations, alterations of the embodiments described herein may be made in various implementations without departing from the scope of the claims.

What is claimed is:

1. A method for a five-wire resistive touch sensor comprising a first conductive layer, a first layer electrode, a second conductive layer, and four second layer electrodes, the method comprising:
   generating a first voltage gradient in a first direction across the second conductive layer;
   while the first voltage gradient is active, measuring a first voltage of the second layer electrode and a first current across the touch sensor;
   generating a second voltage gradient in a second direction across the second conductive layer;
   while the second voltage gradient is active, measuring a second voltage of the second layer electrode and a second current across the touch sensor;
   comparing each of the first and second currents to a respective threshold; and
   detecting a two-touch event as a function of said comparing.

2. The method of claim 1, wherein the four second layer electrodes are positioned at or proximate four corners of the second conductive layer respectively.

3. The method of claim 1, wherein the first direction is substantially orthogonal to the second direction.

4. The method of claim 1, wherein said detecting a two-touch event comprises detecting that at least one of the first and second currents exceeds the respective threshold.

5. The method of claim 1, further comprising determining first and second touch contact positions of the two-touch event.

6. The method of claim 5, wherein determining the first and second touch contact positions comprises:
   estimating a first spacing of the first and second touch contact positions in a first dimension corresponding to the first direction as a function of the first current;
   estimating a second spacing of the first and second touch contact positions in a second dimension corresponding to the second direction as a function of the second current; and
   estimating two ordinates for the first dimension as a function of the first spacing and the first measured voltage, and estimating two ordinates for the second dimension as a function of the second spacing and the second measured voltage.

7. The method of claim 6, further comprising refining the estimated ordinates.

8. The method of claim 7, further comprising measuring a contact resistance between the first conductive layer and the second conductive layer.

9. The method of claim 8, wherein refining the estimated ordinates further comprises compensating the estimated ordinates for the first dimension and the estimated ordinates for the second dimension as a function of the measured contact resistance.

10. The method of claim 9, wherein measuring the contact resistance comprises measuring a resistance between the first layer electrode and, collectively, the four second layer electrodes.

11. The method of claim 9, further comprising measuring, for each said second layer electrode, a respective individual resistance between the second layer electrode and the first layer electrode.

12. The method of claim 11, wherein refining the estimated ordinates further comprises, compensating the measured contact resistance as a function of the measured individual resistances between the four second layer electrodes and the first layer electrode prior to the estimated ordinates as a function of the measured contact resistance.

13. The method of claim 6, further comprising pairing the estimated ordinates for the first dimension and the estimated ordinates for the second dimension to provide first and second contact position coordinates.

14. The method of claim 13, further comprising:

generating first corner-to-corner voltage gradient in the second conductive layer and measuring a first corner-to-corner current; and generating second corner-to-corner voltage gradient in the second conductive layer and measuring a second corner-to-corner current, wherein the pairing of the estimated ordinates is based in part on a comparison of the first and second corner-to-corner currents.

15. A controller apparatus for a five-wire touch sensor comprising a first conductive layer, a first layer electrode, a second conductive layer, four second layer electrodes, the controller apparatus comprising:

a processor;

voltage drive circuitry for driving each of the four second layer electrodes and the first layer electrode;

detector circuitry for detecting voltage or current output of each of at least three of the second layer electrodes and the first layer electrode; and memory operably coupled to the processor and having processor-executable instructions stored thereon that, when executed, cause the processor to implement the method of claim 1.

16. The controller apparatus of claim 15, wherein the detector circuitry comprises, for each of at least one of the first layer electrode or second layer electrodes, a respective Analog to Digital Converter (ADC).

17. The controller apparatus of claim 16, wherein the detector circuitry further comprises, for each of at least one of the first layer electrode or second layer electrodes, a respective offset circuit that amplifies a difference between a baseline voltage and the voltage output of a corresponding electrode.

18. The controller apparatus of claim 17, wherein each said offset circuit comprises a respective Digital to Analog Converter that outputs the baseline voltage, and a respective amplifier that amplifies the difference between the baseline voltage and the voltage output of the corresponding electrode, the difference being input to a corresponding ADC.

19. A touch sensor system comprising:
a five-wire resistive touch sensor; and
the controller apparatus of claim 18.

* * * * *

UNITED STATES PATENT AND TRADEMARK OFFICE
CERTIFICATE OF CORRECTION

PATENT NO. : 10,990,236 B2
APPLICATION NO. : 16/785201
DATED : April 27, 2021
INVENTOR(S) : Albert M. David et al.

Page 1 of 1

It is certified that error appears in the above-identified patent and that said Letters Patent is hereby corrected as shown below:

In the Specification

Column 3, Line 45, delete "a four second" and insert --four second--.

Column 3, Line 48, delete "second layer" and insert --first layer--.

Column 3, Line 52, delete "of the second" and insert --of the first--.

In the Claims

Column 26, Line 17, in Claim 1, delete "second layer" and insert --first layer--.

Column 26, Line 22, in Claim 1, delete "second layer" and insert --first layer--.

Signed and Sealed this
Eighteenth Day of June, 2024

Katherine Kelly Vidal
*Director of the United States Patent and Trademark Office*